United States Patent
Araki et al.

(10) Patent No.: US 9,183,217 B2
(45) Date of Patent: Nov. 10, 2015

(54) METHOD FOR DECOMPRESSING DATA IN STORAGE SYSTEM FOR WRITE REQUESTS THAT CROSS COMPRESSED DATA BOUNDARIES

(71) Applicant: Hitachi, Ltd., Tokyo (JP)

(72) Inventors: Akihiko Araki, Sagamihara (JP); Akira Yamamoto, Sagamihara (JP); Kenta Shiga, Yokohama (JP)

(73) Assignee: HITACHI, LTD., Tokyo (JP)

( * ) Notice: Subject to any disclaimer, the term of this patent is extended or adjusted under 35 U.S.C. 154(b) by 346 days.

(21) Appl. No.: 13/643,815

(22) PCT Filed: Oct. 18, 2012

(86) PCT No.: PCT/JP2012/006694
§ 371 (c)(1),
(2) Date: Nov. 12, 2012

(87) PCT Pub. No.: WO2014/061067
PCT Pub. Date: Apr. 24, 2014

(65) Prior Publication Data
US 2014/0114936 A1    Apr. 24, 2014

(51) Int. Cl.
*G06F 17/30* (2006.01)
*G06F 3/06* (2006.01)
(52) U.S. Cl.
CPC .......... *G06F 17/30153* (2013.01); *G06F 3/064* (2013.01); *G06F 3/0608* (2013.01); *G06F 3/0685* (2013.01)

(58) Field of Classification Search
CPC ...... G06F 3/0608; G06F 3/0685; G06F 3/064; G06F 17/30513; G06F 3/06; G06F 12/20
See application file for complete search history.

(56) References Cited

U.S. PATENT DOCUMENTS

| | | | |
|---|---|---|---|
| 7,747,799 B2 * | 6/2010 | Nakagawa et al. | 710/68 |
| 2007/0233944 A1 * | 10/2007 | Mori et al. | 711/112 |
| 2011/0231629 A1 * | 9/2011 | Shiraishi | 711/206 |
| 2012/0072641 A1 | 3/2012 | Suzuki et al. | |
| 2012/0158647 A1 | 6/2012 | Yadappanavar et al. | |

FOREIGN PATENT DOCUMENTS

JP    4615337 B2    10/2010

* cited by examiner

*Primary Examiner* — Cheng-Yuan Tseng
*Assistant Examiner* — Tahilba Puche
(74) *Attorney, Agent, or Firm* — Volpe and Koenig, P.C.

(57) ABSTRACT

The present invention aims at improving the performance of a compression function in a storage system, and solves the prior art problem of having to decompress a whole compression unit even if a read request or a write request targets only a portion smaller than the compression unit, causing increase of overhead of decompression processing and elongation of processing time, and deteriorating performance. The present invention prevents unnecessary decompression processing and reduces the overhead of processing by suppressing the range of decompression processing to a minimum portion according to the relationship between the read/write request range and the compression unit.

8 Claims, 26 Drawing Sheets

Pattern D
When all following conditions are satisfied in the compression unit
·Beginning LBA of non-compressed data < Write start LBA
·Write Start LBA ≦ Intermediate Point
·End LBA of non-compressed data ≦ (Write start LBA + Write length)

Pattern E
When all following conditions are satisfied in the compression unit
·Write start LBA ≦ Beginning LBA of non-compressed data
·Intermediate Point ≦ (Write start LBA + Write length)
·(Write start LBA + Write length) < End LBA of non-compressed data FIG. 2
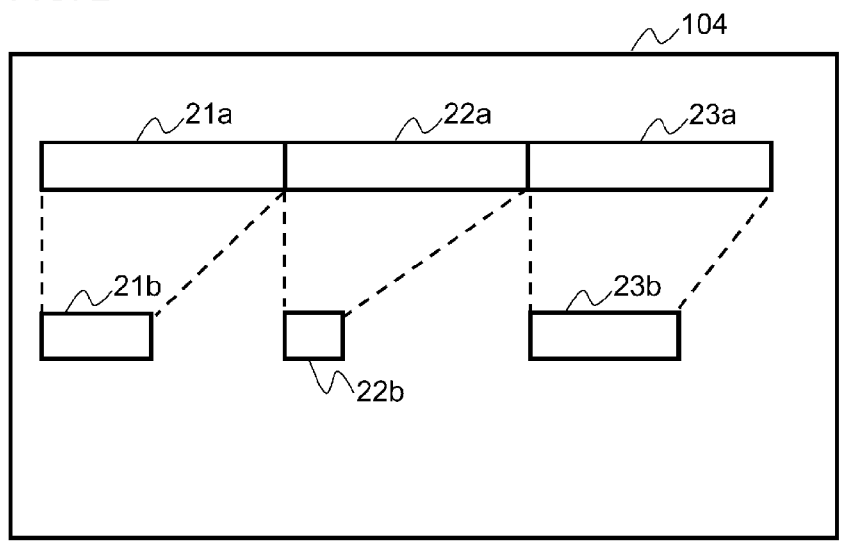
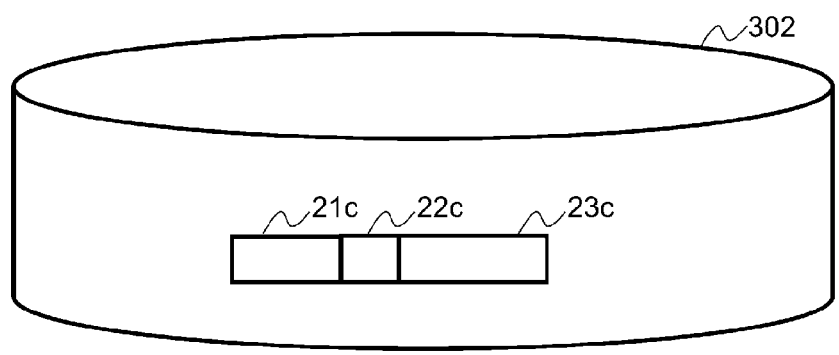
FIG. 3
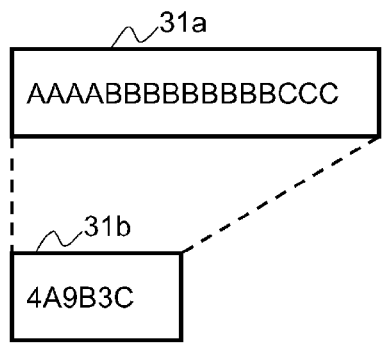

Volume Status Management Table

| LU# | Internal VOL # | Belonging RG/Pool | Capacity | Compression Status |
|---|---|---|---|---|
| 0 | 0 | RG#0 | 1TB | OFF |
| 1 | 1 | Pool#0 | 10TB | ON |
| 2 | 1002 | Pool#1 | 2TB | OFF |
| ... | ... | | ... | ... |
| ... | ... | | ... | ... |

121

Compression Address Management Table

| LBA | Pool# | Inter-pool Sub-block # | Length |
|---|---|---|---|
| 0-256KB | 0 | 0 | 3 |
| 256KB-512KB | 0 | 3 | 1 |
| 512KB-768KB | 0 | 4 | 4 |
| ... | ... | | ... |
| ... | ... | | ... |

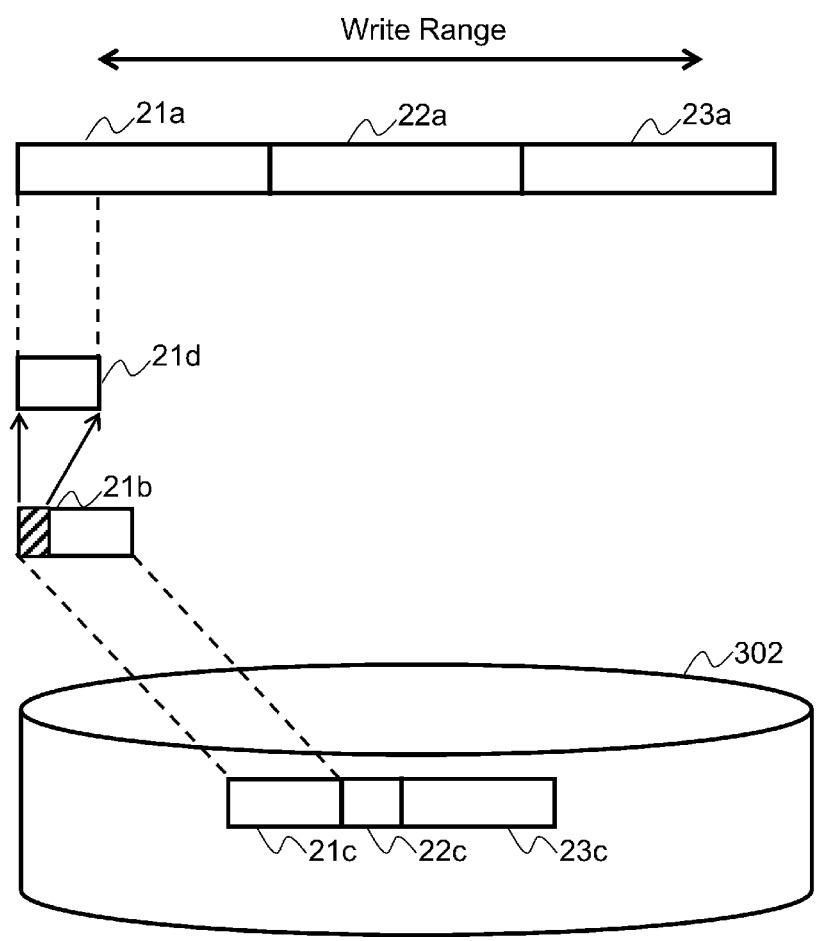

FIG. 9

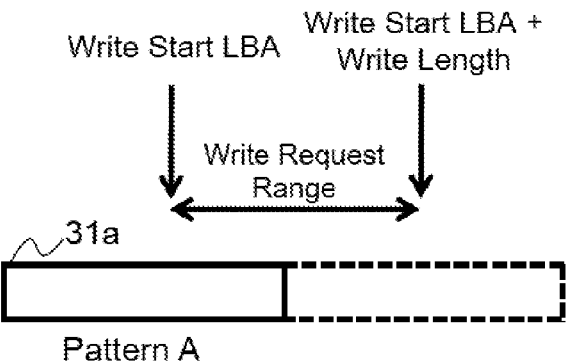

Pattern A

Pattern A
When all following conditions are satisfied in the compression unit
·Beginning LBA of non-compressed data < Write start LBA
·End LBA of non-compressed data ≦ (Write start LBA + Write length)

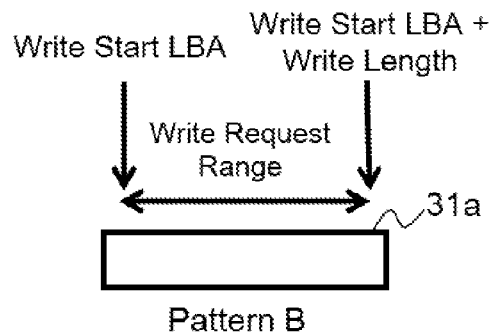

Pattern B

Pattern B
When all following conditions are satisfied in the compression unit
·Beginning LBA of non-compressed data < Write start LBA
·(Write start LBA + Write length) < End LBA of non-compressed data

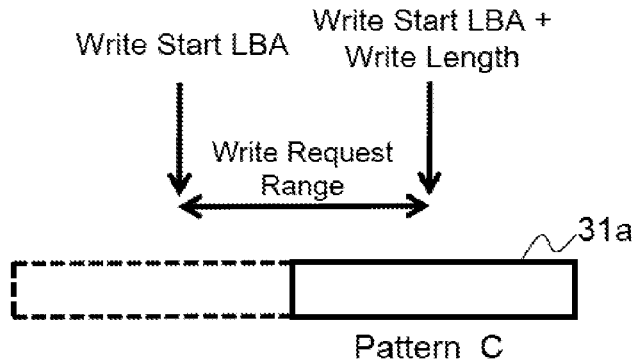

Pattern C

Pattern C
When all following conditions are satisfied in the compression unit
·Write start LBA ≦ Beginning LBA of non-compressed data
·(Write start LBA + Write length) < End LBA of non-compressed data

FIG.15

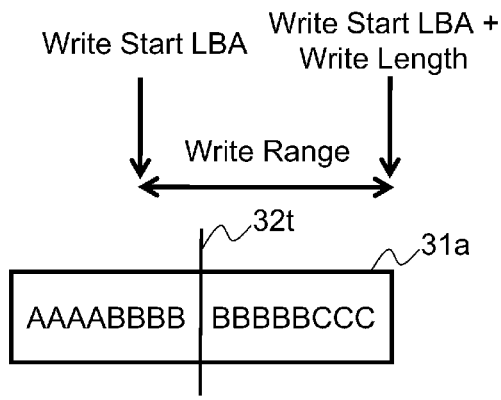

Pattern D
When all following conditions are satisfied in the compression unit
·Beginning LBA of non-compressed data < Write start LBA
·Write Start LBA ≦ Intermediate Point
·End LBA of non-compressed data ≦ (Write start LBA + Write length)

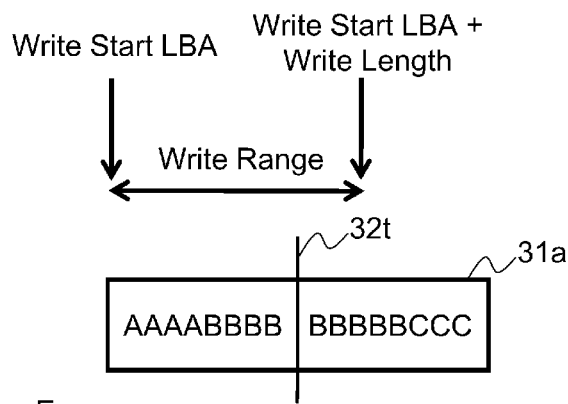

Pattern E
When all following conditions are satisfied in the compression unit
·Write start LBA ≦ Beginning LBA of non-compressed data
·Intermediate Point ≦ (Write start LBA + Write length)
·(Write start LBA + Write length) < End LBA of non-compressed data Pattern H
When all following conditions are satisfied in the compression unit
·Beginning LBA of non-compressed data < Write start LBA
·Write Start LBA ≦ Intermediate Point
·(Write start LBA + Write length) < End LBA of non-compressed data

FIG.22

120
Volume Status Management Table

| LU# | Internal VOL # | Belonging RG/Pool | Capacity | Compression Status | Compression Method |
|---|---|---|---|---|---|
| 0 | 0 | RG#0 | 1TB | OFF | NULL |
| 1 | 1 | Pool#0 | 10TB | ON | Division |
| 2 | 1002 | Pool#1 | 2TB | ON | Normal |
| ... | ... |  | ... | ... |  |
| ... | ... |  | ... | ... |  |

Columns: 1201, 1202, 1203, 1204, 1205, 1206

121
Compression Address Management Table

| LBA | Pool# | Inter-pool Sub-block # | Length | Compression Method |
|---|---|---|---|---|
| 0-256KB | 0 | 0 | 3 | Normal |
| 256KB-512KB | 0 | 2 | 1 | Division |
| 512KB-768KB | 0 | 3 | 4 | Non-compressed |
| ... | ... |  | ... | ... |
| ... | ... |  | ... | ... |

Columns: 1211, 1212, 1213, 1214, 1215

FIG.23

122
Decompression Boundary Management Table

| LBA | Compression method | Decompression Boundary |
|---|---|---|
| 0-256KB | Division | 128KB |
| 256KB-512KB | Division | 144KB |
| 512KB-768KB | Division | 32KB |
| 768KB-1024KB | Non-compressed | NULL |
| 1024KB-1280KB | Normal | NULL |
| ... | ... | |
| ... | ... | |

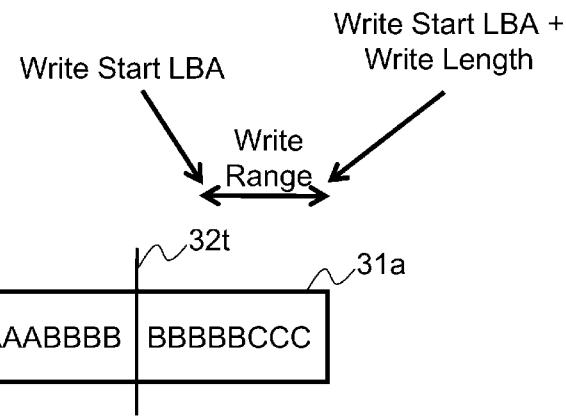

Pattern F
When all following conditions are satisfied in the compression unit
·Intermediate point < Write Start LBA
·End LBA of non-compressed data ≦ (Write start LBA + Write length)

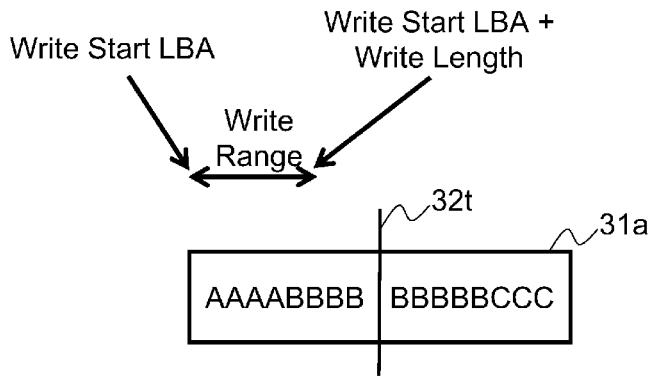

Pattern G
When all following conditions are satisfied in the compression unit
·Beginning LBA of non-compressed data ≦ Write start LBA
· (Write start LBA + Write length) < Intermediate point FIG.26
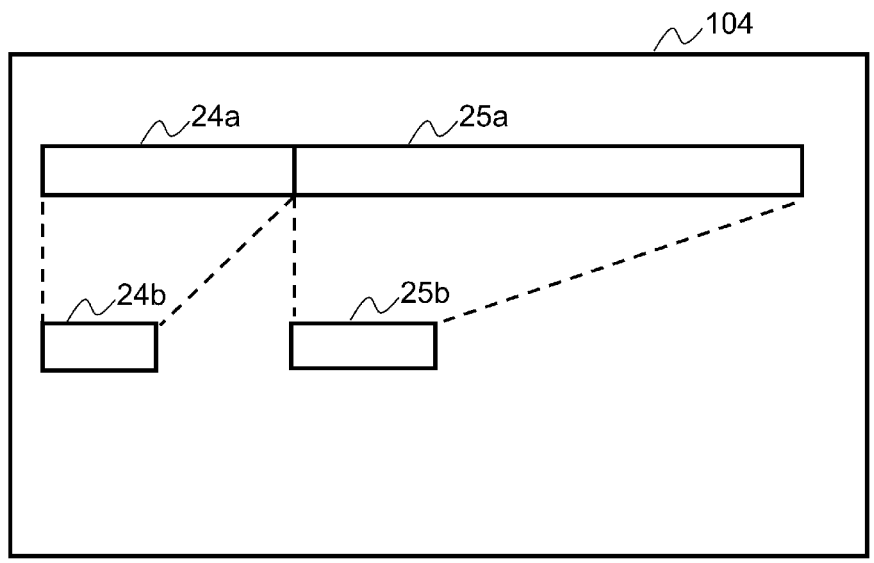
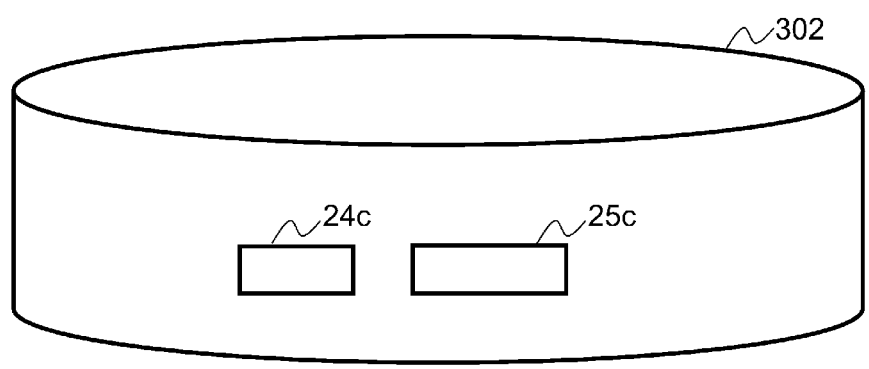

METHOD FOR DECOMPRESSING DATA IN STORAGE SYSTEM FOR WRITE REQUESTS THAT CROSS COMPRESSED DATA BOUNDARIES

TECHNICAL FIELD

The present invention relates to an art for improving the access performance to compressed data in a storage system having a function to compress and store data.

BACKGROUND ART

The amount of data generated in companies or by individuals is rapidly increasing year by year. Especially in companies, there are demands to cut down costs related to media for storing confidential data and other data safely or to cut down management costs.

Some storage systems are provided with a deduplication function or a compression function as functions for cutting down the actual amount of stored data itself.

First, the deduplication function of a storage system generally detects duplicated data in file units or specific data length units, and reduces the amount of data by not storing duplicated data. Such deduplication function is considered to be effective for storage systems used for backup purposes based on such characteristics.

Further, the compression function of a storage system generally divides the data within the volume into given lengths, and compresses the data within each given length so as to compress the whole data within the volume to thereby cut down the capacity. In the present specification, the division of data in a given length is called a compression unit.

The merit of the function for reducing the amount of stored data itself is, of course, the reduction of media costs due to the reduction of the amount of data. On the other hand, the demerit of such function is the deterioration of access performance to the data. Especially in the compression function, when a data read request targeting compressed data is received, the data must be decompressed via compression units, according to which the data read performance is deteriorated due to overhead of decompression processing. Further, when an update request targeting the compressed data is received, the whole data must be decompressed to have the update data overwritten thereto, and the data must be compressed again via compression processing for storage. Therefore, the update performance is deteriorated due to the overhead of the decompression processing and the compression processing.

CITATION LIST

Patent Literature

PTL 1: Japanese Patent No. 4,615,337 (U.S. Pat. No. 7,747,799)

SUMMARY OF INVENTION

Technical Problem

In Patent Literature 1, there exist compressed areas and non-compressed areas within the volume, and when a read request to the compressed area is received, the compressed data is subjected to staging in compression units from the disk to the cache memory, where the compressed data is decompressed, and thereafter, the target area requested by the host computer is transferred from the decompressed data.

According further to Patent Literature 1, if a write request targeting a whole compression unit is received, the write data is compressed without decompressing the compressed data. If the write request does not target the whole compression unit, the compressed data is subjected to staging from the disk to the cache memory, where the compressed data is decompressed, then the write data is combined with the decompressed data, and the combined data is compressed.

As described, according to Patent Literature 1, even when the read request or the write request targets an area smaller than the compression unit, the data of the whole compression unit must be decompressed, so that unnecessary decompression processing is performed.

The object of the present invention is to provide a storage system having a compression function, wherein the read performance and the write performance can be improved by preventing unnecessary decompression processing according to the corresponding relationship between the range of the read or write request and the compression unit.

Solution to Problem

In a storage system having a compression function, unnecessary decompression processing will not be performed by considering the corresponding relationship between the read/write request range and the compression unit.

Advantageous Effects of Invention

The present invention enables to improve the read/write performance with respect to the compressed data by suppressing unnecessary decompression processing corresponding to the read/write request range.

BRIEF DESCRIPTION OF DRAWINGS

FIG. 2 is a view showing one example of the concept of data compression in a storage system according to embodiment 1 of the present invention.

FIG. 3 is a view showing one example of compression processing according to embodiment 1 of the present invention.

FIG. 5 is a view showing one example of a volume status management table and a compression address management table according to embodiment 1 of the present invention.

FIG. 8 is a view showing an example of the corresponding relationship between the write range and the decompression range according to embodiment 1 of the present invention.

FIG. 9 is a view showing one example of the concept of an overwrite pattern according to embodiment 1 of the present invention.

FIG. 15 is a view showing an example of the concept of overwrite pattern (pattern D and pattern E) according to embodiment 2 of the present invention.

FIG. 22 is a view showing one example of a volume status management table and a compression address management table according to embodiment 2 of the present invention.

FIG. 23 is a view showing one example of a decompression boundary management table according to embodiment 3 of the present invention.

FIG. 25 is a view showing one example of the concept of an overwrite pattern according to embodiment 3 of the present invention.

FIG. 26 is a view showing one example of the concept of compressing data in a storage system according to embodiment 4 of the present invention.

DESCRIPTION OF EMBODIMENTS

Now, preferred embodiments of the present invention will be described with reference to the drawings.

In the present embodiment, the areas having an identical configuration and denoted with the same reference numbers operate in the same manner, so the descriptions thereof are omitted.

Embodiment 1

Now, the first embodiment of the present embodiment will be described with reference to FIGS. 1 through 12.

Figure 1:
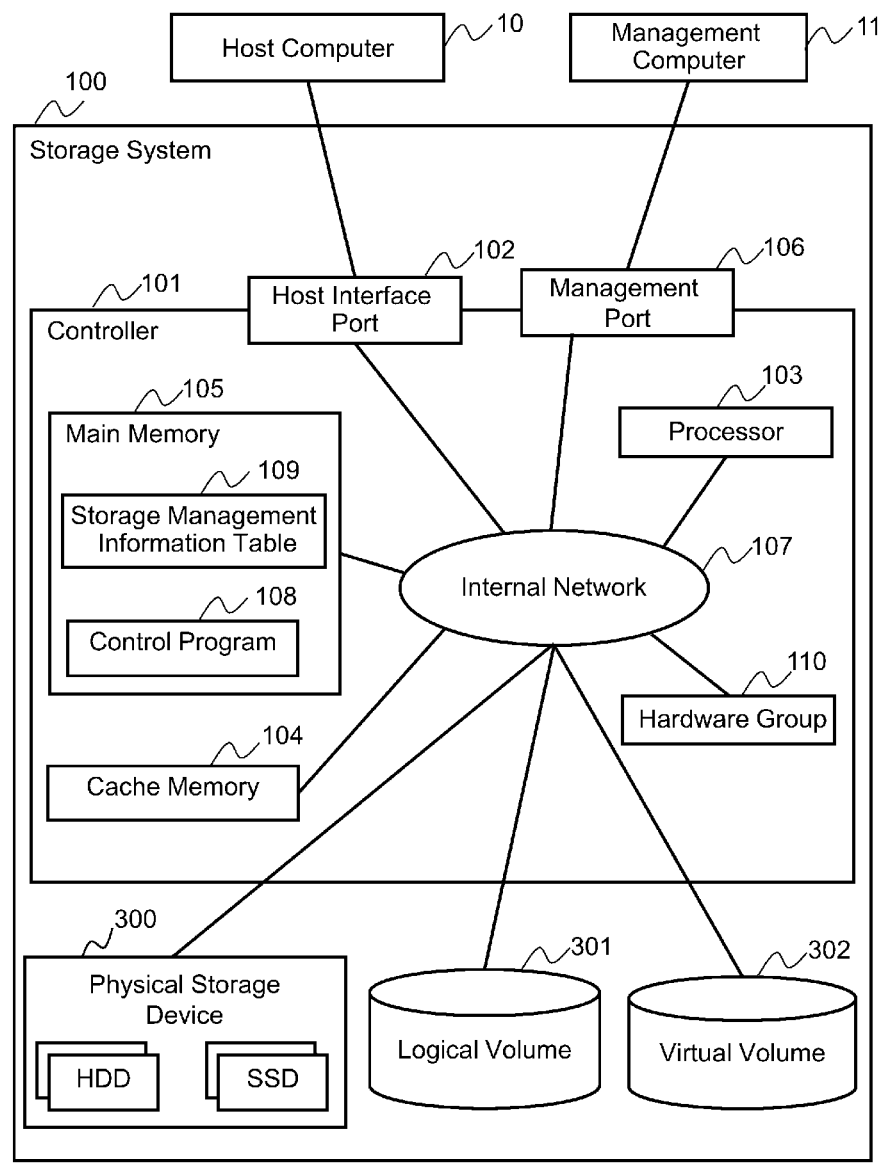
FIG. 1 illustrates a configuration example of a storage system according to embodiment 1 of the present invention.

FIG. 1 is a block diagram illustrating a configuration example of a storage system according to embodiment 1.

A storage system 100 is composed of one or more controllers 101 for controlling the storage system 100, one or more host interface ports 102 for performing transmission and reception of data with a host computer 10, one or more processors 103, one or more cache memories 104, one or more main memories 105, one or more management ports 106 for connecting a management computer 11 for managing the storage system 100 and the storage system 100, a logical volume 301 or a virtual volume 302 for storing user data and the like, a hardware group 110 for performing parity calculation and other various computation processing, and an internal network 107 for mutually connecting components such as the processor 103 and the cache memory 104. Computation processing such as parity calculation can be performed by the processor 103. The cache memory 104 can physically be the same memory as the main memory 105.

The main memory 105 stores a control program 108 and a storage management information table 109. Although not shown, the control program 108 can be, for example, a software for interpreting an I/O (Input/Output) request command issued by the host computer 10 and controlling the internal processing such as the writing and reading of data in the storage system 100. The control program 108 can also include a function (such as a snapshot or dynamic provisioning) for enhancing the availability of the storage system 100. The storage management information table 109 will be described in detail later.

Although not shown, the logical volume 301 has a storage area composed of one or more storage media, and the storage system 100 is capable of making the logical volume 301 look like a storage volume to the host computer 10. Various types of storage media such as HDDs (Hard Disk Drives) and SSDs (Solid State Drives) can exist in a mixture, but as a typical physical storage media, the storage system 100 includes a physical storage device 300 composed of one or more HDDs and one or more SSDs. The storage system 100 can have a plurality of RAID groups in which storage media are formed into groups via RAID (Redundant Array of Independent Disks) technology. A single RAID group is capable of defining a plurality of logical volumes 301 and utilizing the same. A logical volume 301 is usually composed of HDD or other nonvolatile storage media realizing redundancy via RAID technology, but the logical volume according to the present invention is not restricted thereto, and any unit capable of storing data can be used. The logical volume 301 can store various types of management information that the storage system 100 has, in addition to storing user data. In the present description, the logical volume is sometimes simply referred to as LU (Logical Unit).

The virtual volume 302 is a storage area provided via a dynamic provisioning function of the storage system 100, which is one type of logical volume characterized in allocating a storage area at the point of time when data is written from the host computer 10 to the virtual volume 302. The allocation unit of the virtual volume can be the same as the unit of compression, or multiple allocation units can be set equal to a single compression unit, or multiple compression units can be set equal to a single allocation unit. The main memory 105 holds the following various types of management information. In addition, the storage system 100 can be equipped with a load monitor function for managing the load statuses of the host interface port 102, the processor 103, the cache memory 104 or the logical volume 301 that the system has. In addition, the host computer 10 is capable of having a program for collecting statics information of the I/O command issued to the storage system 100, and enabling the storage system 100 to refer to the information for internal control. The processor 103 can also include a unique memory that differs from the main memory 105 and the cache memory 104. The host interface port 102 should only be equipped with a block interface such as a Fibre Channel, an iSCSI or an FCoE. Further, the host interface port 102 can also include a file interface. The management port 106 can be connected to the management computer 11 via a LAN (Local Area Network), for example. Unless otherwise denoted in the present description, the main subject of the processes is the processor 103.

FIG. 2 is a view showing one example of the concept of a data compression function of the storage system 100 according to embodiment 1.

The cache memory 104 stores non-compressed data 21a, 22a and 23a which are targets of read and write processing of the host computer 10. The non-compressed data 21a, 22a and 23a are each data corresponding to a different logical address of the virtual volume 302. Further, the non-compressed data 21a, 22a and 23a are each divided into given management units of the cache memory 104. The given management unit can be, for example, 256 KB. The processor 103 executes compression processing of the non-compressed data 21a, 22a and 23a to generate compressed data 21b, 22b and 23b, and stores the same in the cache memory 104. The compression processing can be executed by the hardware group 110. The compressed data 21b, 22b and 23b generated after compression processing can be overwritten to the non-compressed data 21a, 22a and 23a, or can be stored in separate areas in the cache memory 104. The virtual volume 302 stores compressed data 21b, 22b and 23b, but in some cases, it is possible to have the non-compressed data 21a, 22a and 23a stored in the virtual volume 302, wherein compression processing is executed at a given timing, and thereafter, the compressed data 21b, 22b and 23b can be stored again in the virtual volume 302. In FIG. 2, the compressed data in the virtual volume 302 is referred to as 21c, 22c and 23c, but the data can be the same as the compressed data 21b, 22b and 23b stored in the cache memory 104.

FIG. 3 is a view showing one example of compression processing according to embodiment 1. The compression processing according to the present invention can utilize a generally used compression algorithm. For example, the algorithm can be a run-length compression algorithm (run length encoding), or the algorithm can be an LZ77 which replaces the area corresponding to a specific data pattern with the location information corresponding to the corresponding data pattern. In the present invention, an example where run-length compression algorithm is used is described as an example, but algorithms other than run-length compression algorithm can also be used effectively according to the present invention. For example, it is assumed that the data of the non-compressed data 31a is "AAAABBBBBBBBBCCC". When the non-compressed data 31a is compressed via run-length compression algorithm, "4A9B3C" is output. This compression result means that "four As, nine Bs and three Cs exist successively from the beginning". As described, run-length compression algorithm compresses data by expressing successive data by the length of successive data.

Figure 4:
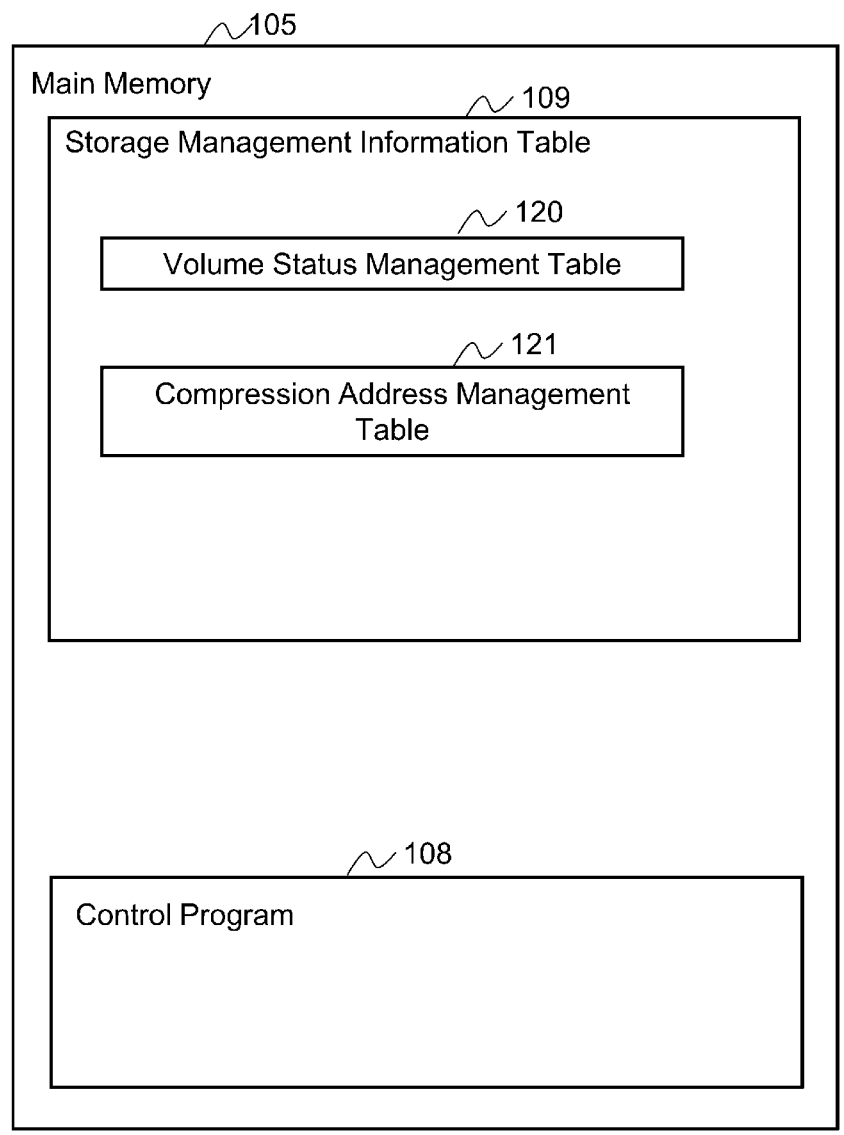
FIG. 4 is a view showing one example of the management information that the storage system has according to embodiment 1 of the present invention.

FIG. 4 is a block diagram showing one example of the storage management information table 109 that the storage system 100 has according to the first embodiment. The main memory 105 comprises a storage management information table 109 and a control program 108. The storage management information table 109 further comprises a volume status management table 120 and a compression address management table 121. In addition, the main memory 105 can store other management information and tables. The details of the volume status management table 120 and the compression address management table 121 will be described with reference to FIG. 5.

FIG. 5 is a view showing one example of the volume status management table 120 and the compression address management table 121 according to embodiment 1.

The volume status management table 120 is a table composed of the following items: an LU #1201, an internal VOL #1202, a belonging RG/Pool 1203, a capacity 1204, and a compression status 1205. The LU #1201 denotes the number of the LU, which is an identification number used by the host computer 10 to identify the logical volumes 301. The internal VOL #1202 is an identification number used for the storage system 100 to internally identify the logical volume 301. The LU #1201 and the internal VOL #1202 may or may not correspond. The belonging RG/Pool 1203 is an identification number identifying the RAID group or the pool in which the relevant LU belongs. The term pool refers to an assembly of storage areas to which the virtual volume 302 belongs. The storage system 100 can have a plurality of pools in the interior thereof, wherein the virtual volume 302 allocates a capacity from the pool. The capacity 1204 refers to the definition capacity of the LU. The compression status 1205 refers to the status of compression of the LU. For example, the LU in which the compression status is OFF means that the LU is in a state where no compression processing has been performed. The LU in which the compression status is ON indicates that the LU is subjected to compression processing based on the request from the host computer 10 or the management computer 11, or based on the result of automatic determination of the storage system 100. As described, according to the present invention, compression can be requested per LU, or the storage system 100 can perform automatic compression of the LU.

The compression address management table 121 is a table composed of the following items: an LBA 1211, a Pool #1212, an inter-pool sub-block #1213 and a length 1214. The compression address management table 121 is provided for each LU. The LBA 1211 refers to the logical address section of the LU. In the present embodiment, the logical address is divided into 256-KB sections, and the divided 256 KB sections are set as the compression units. The pool #1212 refers to the number of the allocation destination pool of the compressed data of the LBA section of the relevant LU. The inter-pool sub-block #1213 refers to a start address within the pool allocated to the relevant LBA of the relevant LU. The sub-block # is a management unit of the storage area within the pool, wherein a 64-KB unit corresponds to a single sub-block. The length 1214 refers to the storage area within the pool allocated to the relevant LBA of the relevant LU by the length starting from the inter-pool sub-block #1213. For example, if the length is 1, it means that the LBA section of the LU is compressed to a single sub-block section, and the storage destination of the compressed data can be uniquely specified by the pool #1212, the inter-pool sub-block #1213 and the length 1214. For example, if the compression unit is in 256-KB units of LBA and the sub-block is in 64-KB units, and if the length is 4, it may mean that the relevant LBA section is composed of non-compressed data. In that case, non-compressed data is stored in the pool.

The present description has assumed that compressed data is necessarily stored in successive sub-blocks within the pool, but the present invention is not restricted to such example, and compressed data may be stored in non-successive sub-blocks within the pool. It is also possible for the compressed data to be stored in a dispersed manner in multiple pools.

Figure 6:
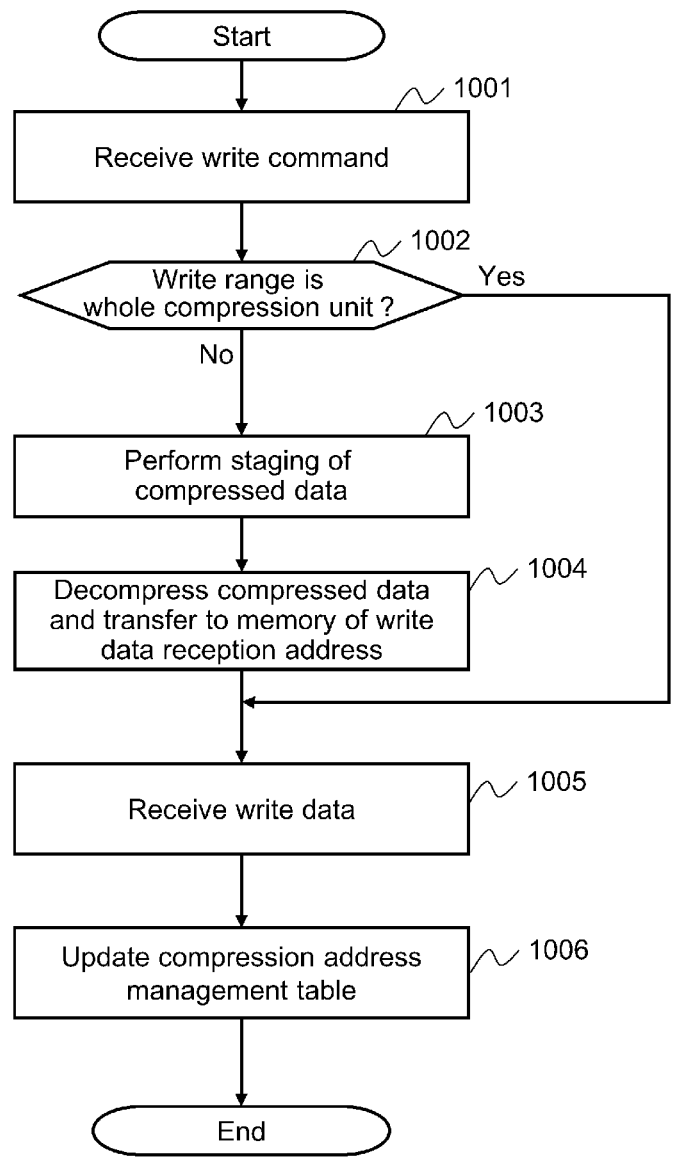
FIG. 6 is a flowchart illustrating a prior art example of write processing according to embodiment 1 of the present invention.

FIG. 6 is a flowchart showing one example of a conventional write processing according to the first embodiment.

The flow of a conventional write processing will be described. In the flowchart described hereafter, unless otherwise denoted, the processes are mainly executed via the processor 103 of the storage system 100.

At first, the storage system 100 receives a write command from the host computer 10 in step 1001. The write command includes information such as a write issue destination LU #, a write issue destination LBA, a write data length and a host ID. Next, in step 1002, the system refers to the compression address management table 121 to determine whether the write range of the write command is the whole compression unit or not. The determination method can be determined by referring to the write issue destination LU #, the write issue destination LBA, the write data length and the compression address management table 121 included in the write command. If the result of determination in step 1002 is Yes, that is, if the write range is the whole compression unit, the procedure advances to step 1005. In step 1005, the write data is received from the host computer 10. Next, the procedure advances to step 1006, where the compression address management table 121 is updated and the process is ended. In the update of the compression address management table 121 of step 1006, the pool #1212, the inter-pool sub-block #1213 and the length 1214 of the compression address management table 121 corresponding to the LU and the LBA of the write issue destination should simply be updated. This is because the length 1214 may be varied by decompressing the compressed data, and along therewith, the inter-pool sub-block #1213 and the pool #1212 may also be varied. If the result of determination of step 1002 is NO, the procedure advances to step 1003. In step 1003, the compressed data corresponding to the compression unit is subjected to staging from the HDD (or any storage media disposed in the storage system 100 as long as it is the final storage destination of the compressed data) to the cache memory 104. Next, the procedure advances to step 1004, where the compressed data subjected to staging is decompressed, and the decompressed data is transferred to the area of the cache memory 104 corresponding to the address of the write range. Thereafter, the procedure advances to step 1005.

Although not shown, the write data can be compressed immediately after the end of the flowchart, or the write data can be stored in the non-compressed state to the HDD and compression can be performed thereto at a given timing. When compression processing is executed, the compression address management table 121 should be updated and the compressed data should be stored in the HDD.

Figure 7:
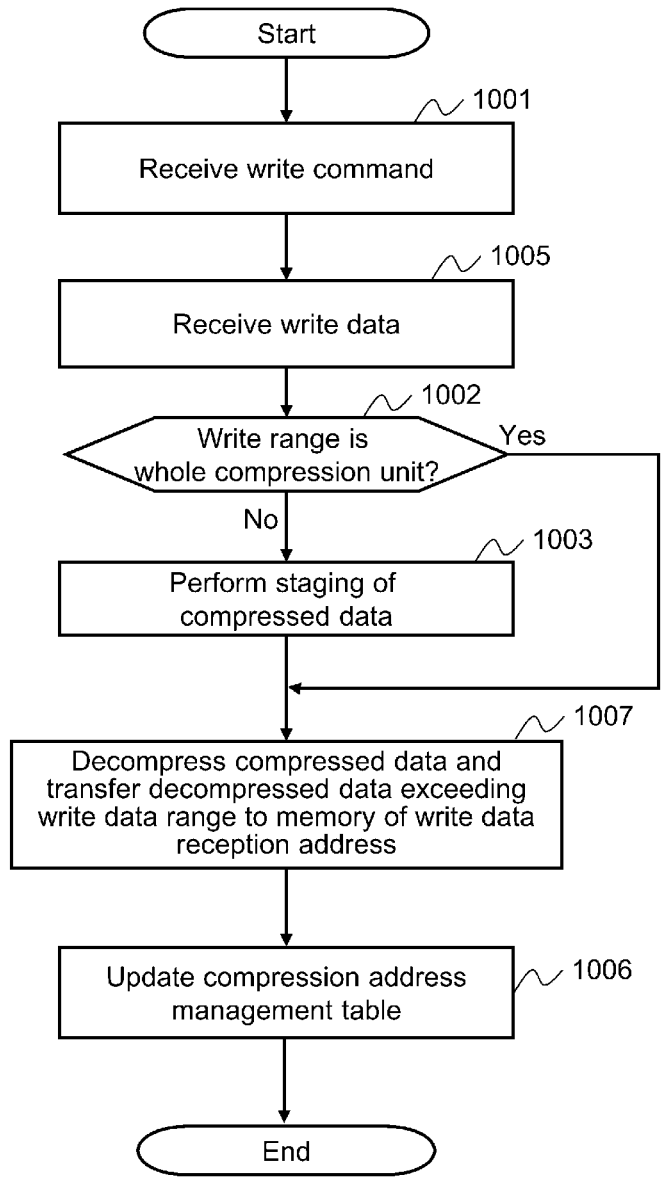
FIG. 7 is a flowchart illustrating a prior art example of write processing according to embodiment 1 of the present invention.

FIG. 7 is a flowchart showing one example of a conventional write processing according to embodiment 1. The difference from FIG. 6 is that the reception of write data is performed immediately after receiving the write command in FIG. 7. In the present processing, step 1004 in FIG. 6 is changed to step 1007. Step 1007 will now be described. In step 1007, the compressed data subjected to staging is decompressed, and only the decompressed data exceeding the range of write data is transferred to the write data reception address of the cache memory 104. This step is performed so as to prevent the write data from being overwritten with the decompressed data.

FIG. 8 is a view showing one example of the corresponding relationship between the write range and the decompression range according to embodiment 1. One of the objects of the present invention is to enhance the write performance of the system by suppressing unnecessary decompression processing in correspondence with the write range. FIG. 8 illustrates an example of a case where a write request targeting a range straddling successive non-compressed data 21a, 22a and 23a of the LBA. When non-compressed data is updated via the write process, compression must be performed again for each compression unit, but in order to do so, it is necessary to decompress the compressed data corresponding to the relevant non-compressed data and to complete the non-compressed data of the compression unit. In the write processing according to the conventional compression function, as shown in FIGS. 6 and 7, the whole compressed data corresponding to the non-compressed data of the relevant compression unit is decompressed unless the write request targets the whole compression unit.

Therefore, according to the present invention, if the write range targets only a portion of the compression unit, the processing overhead of the decompression processing is reduced by decompressing only the portion of the compressed data corresponding to the non-compressed data not included in the write range. For example, by focusing on the non-compressed data 21a of FIG. 8, it can be recognized that the leading portion of the non-compressed data 21a is not set as the write range. Therefore, according to the present invention, only the leading portion that is not set as the write range is decompressed from the compressed data 21b, and set as a partially decompressed data 21d. The partially decompressed data 21d is the portion of the non-compressed data of the portion not included in the write range within the non-compressed data 21a. On the other hand, by focusing on the non-compressed data 23a, the terminal end portion of the non-compressed data 23a is outside the write range. In order to achieve the object of the present invention, only the terminal end portion of the non-compressed data 23a should be decompressed, but since the compression algorithm detects successive data from the beginning of the non-compressed data and replaces the successive data with the length information, it is not possible to decompress only the terminal end portion using a general algorithm. The method for solving this problem will be described in a different embodiment. The decompression processing is not necessary if a write request regarding the relevant non-compressed data is received in a state where the non-compressed data 21a, 22a and 23a are stored in the cache memory 104.

FIG. 9 is a view showing one example of the concept of an overwrite pattern according to embodiment 1. In FIG. 9, a total of three patterns is defined based on the corresponding relationship between the compression unit and the write range.

Pattern A refers to a case where the beginning section of the non-compressed data 31a is not set as the write range, in which the following two conditions are both satisfied. The two conditions are the following conditions in the relevant compression unit: "beginning LBA of non-compressed data<write start LBA" and "end LBA of non-compressed data<(write start LBA+write length)" or "end LBA of non-compressed data=(write start LBA+write length)". If these conditions are satisfied, according to the first embodiment, only the area of the compressed data outside the write range should be decompressed.

Pattern B refers to a case where the beginning section and the terminal end section of the non-compressed data 31a are not set as the write range, in which the following two conditions are both satisfied. The two conditions are the following conditions in the relevant compression unit: "beginning LBA of non-compressed data<write start LBA" and "(write start LBA+write length)<end LBA of non-compressed data".

Pattern C refers to a case where the terminal end section of the non-compressed data 31a is not set as the write range, in which the following two conditions are both satisfied. The two conditions are the following conditions in the relevant compression unit: "write start LBA<beginning LBA of non-compressed data" or "write start LBA=beginning LBA of non-compressed data", and "(write start LBA+write length) <end LBA of non-compressed data".

In the following specification, the areas referred to as pattern A, pattern B and pattern C denote pattern A, pattern B and pattern C illustrated in FIG. 9. Each pattern illustrated in FIG. 9 is also realized by replacing the term write with read.

Figure 10:
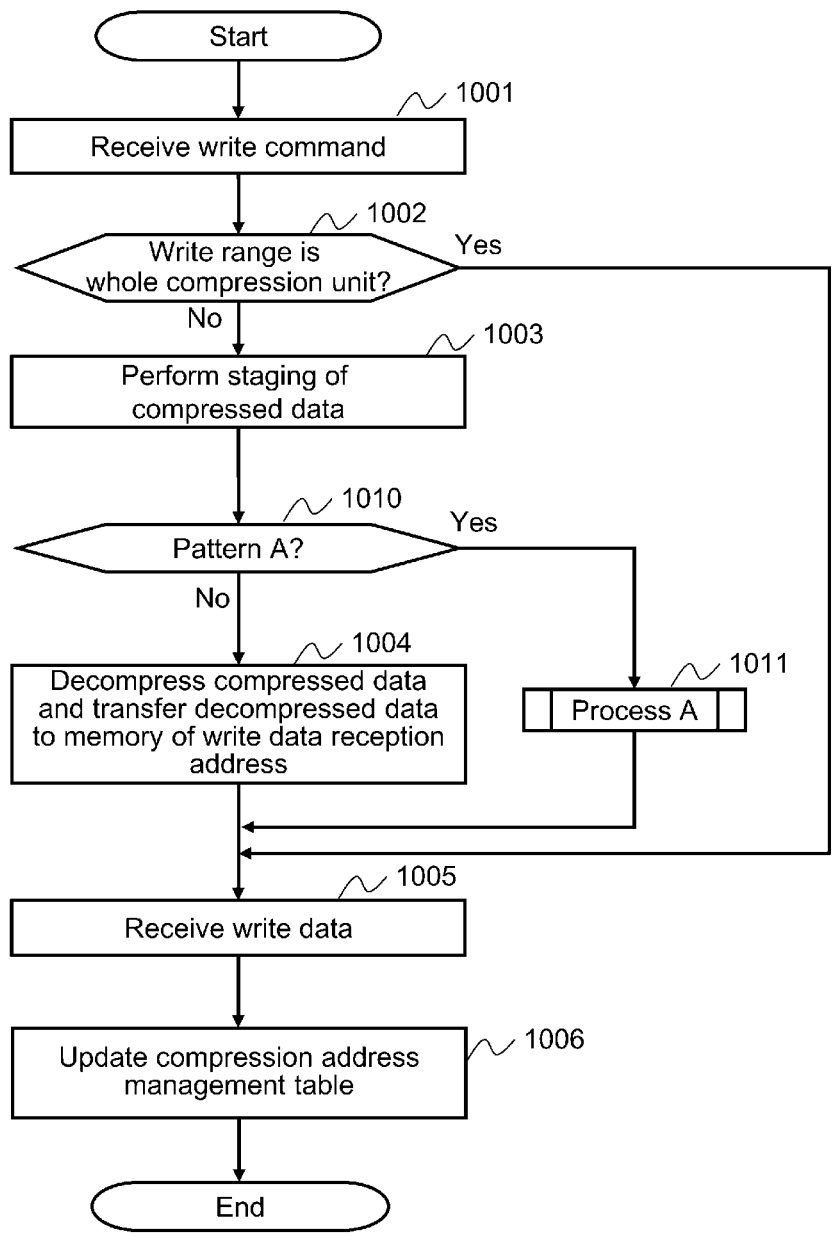
FIG. 10 is a flowchart showing an example of write processing according to embodiment 1 of the present invention.

FIG. 10 is a flowchart showing one example of the write processing of the present invention according to embodiment 1. FIG. 10 is similar to FIG. 6, but the difference between FIG. 6 is that in FIG. 10, step 1010 is added prior to step 1004 of FIG. 6, and that step 1011 is added. Here, we will describe only the differences between FIG. 10 and FIG. 6. After staging the compressed data in step 1003, it is determined in step 1010 whether the relevant write request is pattern A or not. If the determination result of step 1010 is No, the procedure advances to step 1004. If the determination result of step 1010 is Yes, the procedure advances to process A of step 1011. The process A of step 1011 is described in detail with reference to FIG. 11. According to FIG. 10, similar to FIG. 6, after ending the flowchart, the write data can be compressed immediately, or the write data can be temporarily stored in the HDD and compression can be performed at a given timing. It is also possible to receive the write data immediately after receiving the write command. In that case, it is possible to combine the present flowchart with the flowchart of FIG. 7. In addition, when the target of the write request straddles a plurality of compression units, the process of FIG. 10 should be repeated for the relative compression units. In addition, after ending the process of FIG. 10, it is possible to return a write complete response to the host computer 10.

Figure 11:
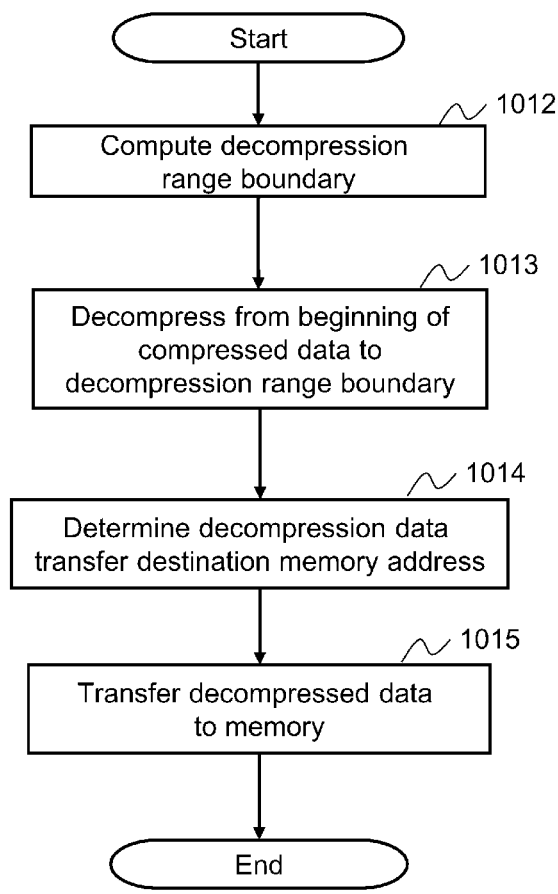
FIG. 11 is a flowchart showing an example of partial decompression processing according to embodiment 1 of the present invention.

FIG. 11 is a flowchart showing one example of the process A of step 1011 shown in the flowchart of FIG. 10, that is, a partial decompression processing.

At first, in step 1012, the area required for decompression out of the compressed data subjected to staging is computed. Actually, by referring to the compression address management table 121 based on the write issue destination LU #, the write issue destination LBA and the write data length included in the write command received by the storage system 100, the LBA section of the decompressed data required for the current decompression processing is computed. For example, if the write issue destination LBA is 100 KB, the write data length is 156 KB and the compression unit is 256 KB, the LBA section of the decompressed data required for the current decompression processing is recognized to be 100 KB from the beginning of the compression unit. Now, the location of the decompressed data required for the current decompression processing is called a decompression range boundary. Next, the procedure advances to step 1013, where decompression processing is executed to the compressed data from the beginning of the compression unit to the decompression range boundary. If decompressed data exceeding the decompression range boundary is generated, the decompression processing should be stopped at that point of time. Next, the procedure advances to step 1014, where the destination of transmission of decompressed data to the decompression range boundary generated in step 1013 is determined Here, the area of the cache memory 104 determined uniquely based on the issue destination LU #, the issue destination LBA and the length of the relevant write command can be set as the transfer destination. Next, the procedure advances to step 1015, wherein the decompressed data generated in step 1013 is transferred to the transfer destination determined in step 1014, and the process A is ended.

Figure 12:
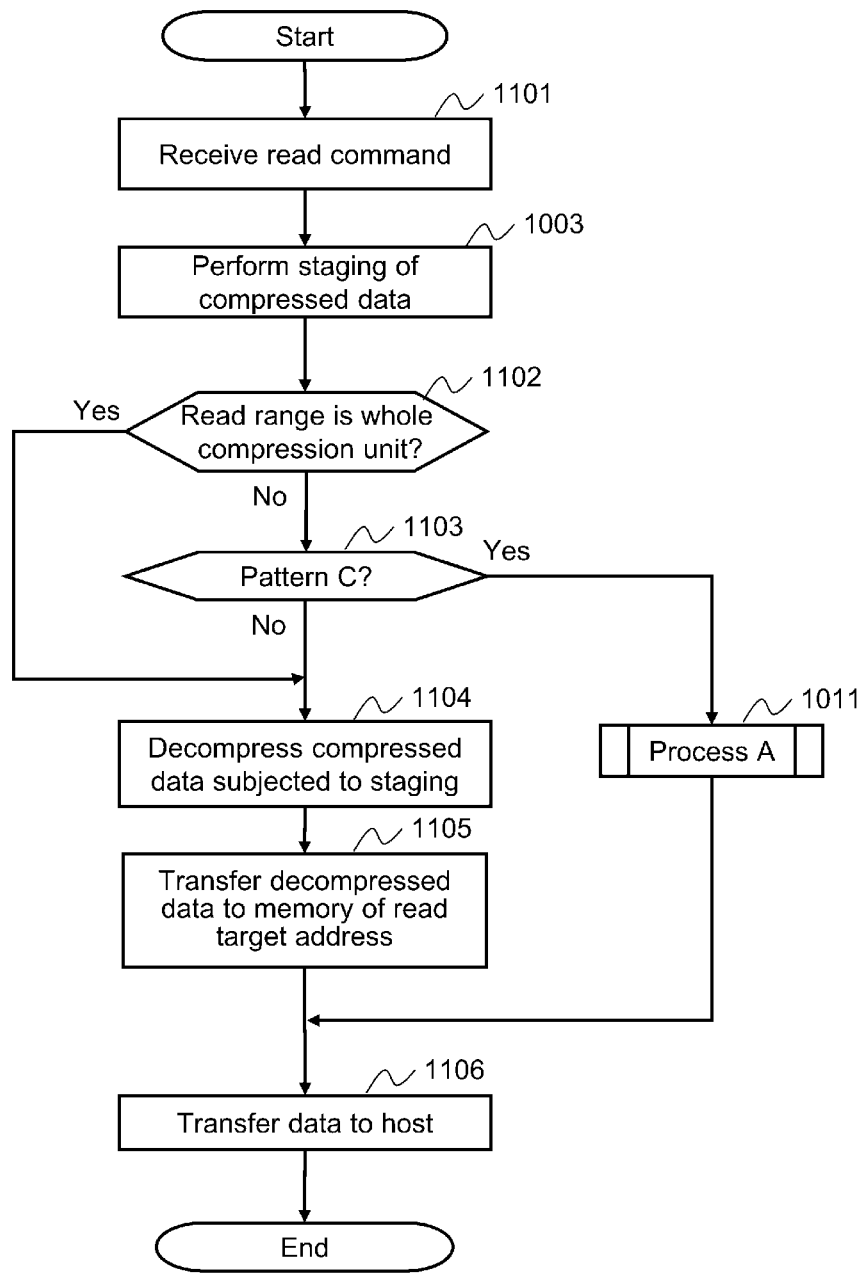
FIG. 12 is a flowchart showing an example of read processing according to embodiment 1 of the present invention.

FIG. 12 is a flowchart illustrating one example of the read processing according to embodiment 1. One of the objects of the present invention is to suppress unnecessary decompression processing in accordance with the read range, and to thereby enhance the read performance.

At first, in step 1101, the storage system 100 receives a read command from the host computer 10. Next, in step 1003, the system refers to the compression address management table 121 and subjects the compressed data to staging. Next, in step 1102, the system determines whether the read range is the whole compression unit or not. The determination can be performed by referring to the read issue destination LU #, the read issue destination LBA and the read data length included in the read command, and the compression address management table 121. If the determination result of step 1102 is Yes, the procedure advances to step 1104. In step 1104, the compressed subjected to staging is decompressed. Next, the procedure advances to step 1105, and the decompressed data is transmitted to the area of the cache memory 104 corresponding to the read range. Next, the procedure advances to step 1106, wherein the decompressed data is transferred to the host computer 10. On the other hand, if the determination result of step 1102 is No, the procedure advances to step 1103. In step 1103, the system determines whether the relevant read command is pattern C or not. If the determination result of step 1103 is No, the procedure advances to step 1104. If the determination result of step 1103 is Yes, the procedure advances to step 1011, and process A is performed. Since the decompression range required for the read processing is the read request range, when the read command is pattern C, process A is performed. Further, the decompression range boundary in step 1012 of process A in the read processing should be set as the read request range. Further, if the read request straddles a plurality of compression units, the process of FIG. 12 should be performed repeatedly for the relevant compression unit.

Embodiment 2

Now, embodiment 2 of the present invention will be described with reference to FIGS. 13 through 22. In embodiment 2, the method for solving pattern B and pattern C that cannot be solved by embodiment 1 will be described. The details of the present embodiment will now be illustrated.

Figure 13:
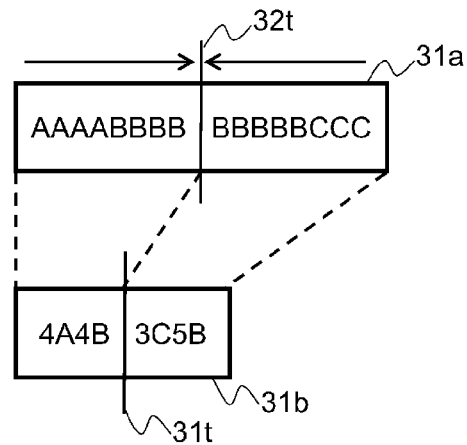
FIG. 13 is a view showing an example of compression processing according to embodiment 2 of the present invention.

FIG. 13 is a view showing one example of the concept of compression processing according to embodiment 2. In embodiment 1, the run-length compression algorithm has been illustrated as a typical example of a common compression algorithm, and embodiment 2 will also be described taking the run-length compression algorithm as the example. In a common run-length compression algorithm, the compression target data is searched from the beginning to detect successive data, and the successive data is replaced with length information in order to compress data. In embodiment 2, to cope with pattern C, the non-compressed data 31a being the target of compression is divided at intermediate point 32t, wherein from the beginning of the data to the intermediate point 32t, successive data is compressed from the beginning in the conventional manner, whereas from the intermediate point 32t to the end of the data, successive data is searched from the end toward the intermediate point 32t for compressing data. Assuming that the non-compressed data 31a is "AAAABBBBBBBBBCCC", for example, if the non-compressed data 31a is compressed via the run-length compression algorithm of embodiment 2, the non-compressed data 31*a* will be divided into "AAAABBBB" and "BBBBBCCC". When each divided half is compressed via the run-length compression algorithm, "AAAABBBB" will be "4A4B", and "BBBBBCCC" will be "3C5B". The compression of the non-compressed data 31*a* from the intermediate point 32*t* to the end section searches the successive data from the end toward the beginning direction so that the arrangement of compressed data 31*b* will be varied. As a result, compressed data 31*b* will become "4A4B3C5B". Though information for identifying the position of an intermediate point 31*t* of compressed data 31*b* corresponding to the intermediate point 32*t* of the non-compressed data 31*a* is required, it is possible to include the information in the header information of the compressed data or in the compression address management table 121.

Figure 14:
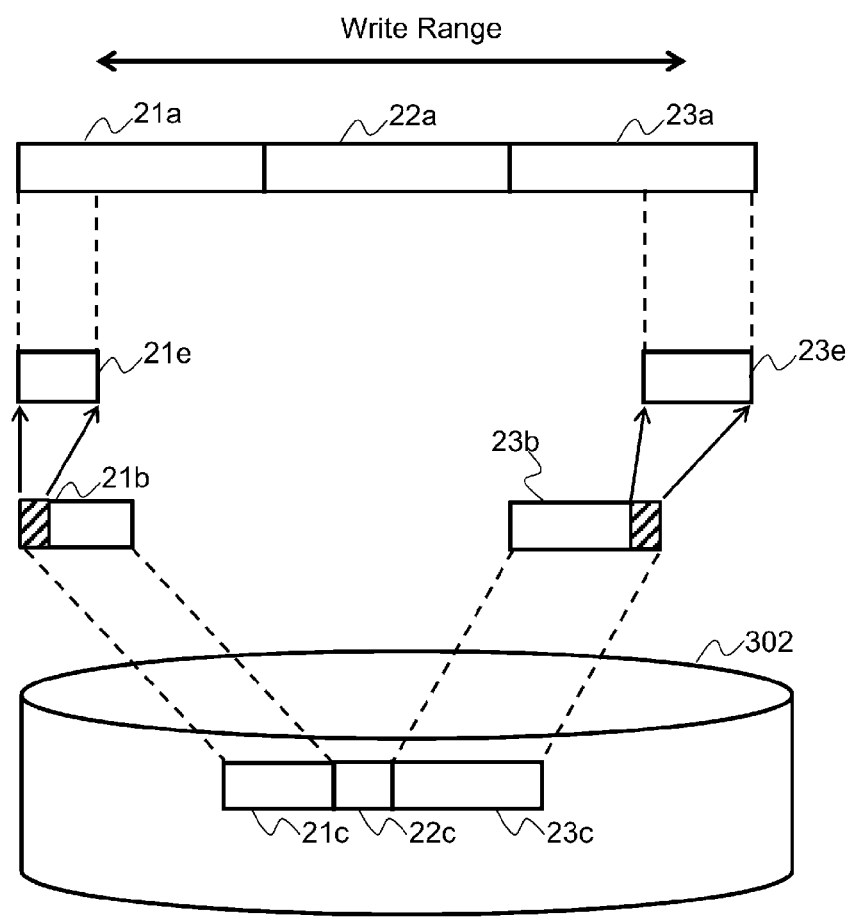
FIG. 14 is a view showing an example of the corresponding relationship between the write range and the decompression range according to embodiment 2 of the present invention.

FIG. 14 is a view showing one example of the corresponding relationship between the write range and the decompression range according to embodiment 2. FIG. 14 is similar to FIG. 8, but in FIG. 14, a partially decompressed data 23*e* corresponding to the non-compressed data 23*a* is added. This is because as described in FIG. 13, the search direction of the successive data of the compression algorithm is changed to the opposite direction at the intermediate point of the compression unit, so that it becomes possible to decompress only the terminal end of the compression unit.

Figure 16:
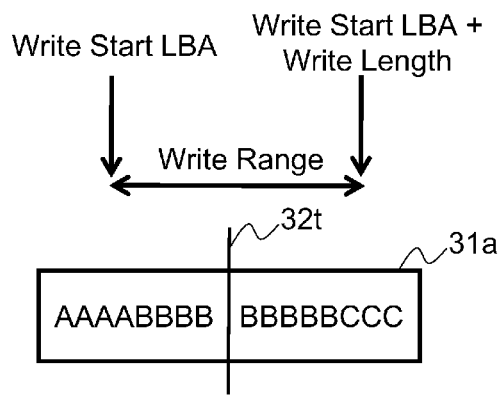
FIG. 16 is a view showing an example of the concept of overwrite pattern (pattern H) according to embodiment 2 of the present invention.

FIGS. 15 and 16 illustrate an example of the concept of the overwrite pattern according to embodiment 2. In FIGS. 15 and 16, a total of three patterns are defined based on the corresponding relationship between the compression unit and the write range.

Pattern D denotes a case where all the three conditions mentioned below are satisfied. The three conditions are the following in the relevant compression unit: "beginning LBA of non-compressed data<write start LBA", "write start LBA<intermediate point" or "write start LBA=intermediate point", and "end LBA of non-compressed data<(write start LBA+write length)" or "end LBA of non-compressed data=(write start LBA+write length)". When these conditions are satisfied, according to embodiment 2, the area from the beginning to the intermediate point of the compressed data should be decompressed. Further, as described in embodiment 1, it is possible to decompress only the area up to the decompression range boundary.

Next, pattern E will be described. Pattern E refers to a case where all the following three conditions mentioned below are satisfied. The three conditions are the following in the relevant compression unit: "write start LBA<beginning LBA of non-compressed data" or "write start LBA=beginning LBA of non-compressed data", "intermediate point<(write start LBA+write length)" or "intermediate point=(write start LBA+write length)", and "(write start LBA+write length)<end LBA of non-compressed data". When these conditions are satisfied, according to the second embodiment, it is only necessary to perform decompression from the end to the intermediate point of the compressed data. Further, as described in embodiment 1, it is possible to decompress only the area up to the decompression range boundary. This case corresponds to pattern C that could not be solved according to embodiment 1.

FIG. 16 defines pattern H, which is the third pattern according to embodiment 2. Pattern H denotes a case where all the following three conditions shown below are satisfied. The three conditions are the following in the relevant compression unit: "beginning LBA of non-compressed data<write start LBA", "write start LBA<intermediate point" or "write start LBA=intermediate point", and "(write start LBA+write length)<end LBA of non-compressed data". When these conditions are satisfied, according to embodiment 2, the area "from the beginning of the relevant compression unit to the write start LBA" and the area "from the (write start LBA+write length) to the end of the relevant compression unit" should be decompressed. This case corresponds to pattern B that could not be solved according to embodiment 1.

In the following specification, the areas referred to as pattern D, pattern E and pattern H denote pattern D, pattern E and pattern H illustrated in FIGS. 15 and 16. Each pattern illustrated in FIGS. 15 and 16 is also satisfied when the term write is replaced with read. In that case, the write start LBA should be replaced with read start LBA, and the write length should be replaced with read length.

Figure 17:
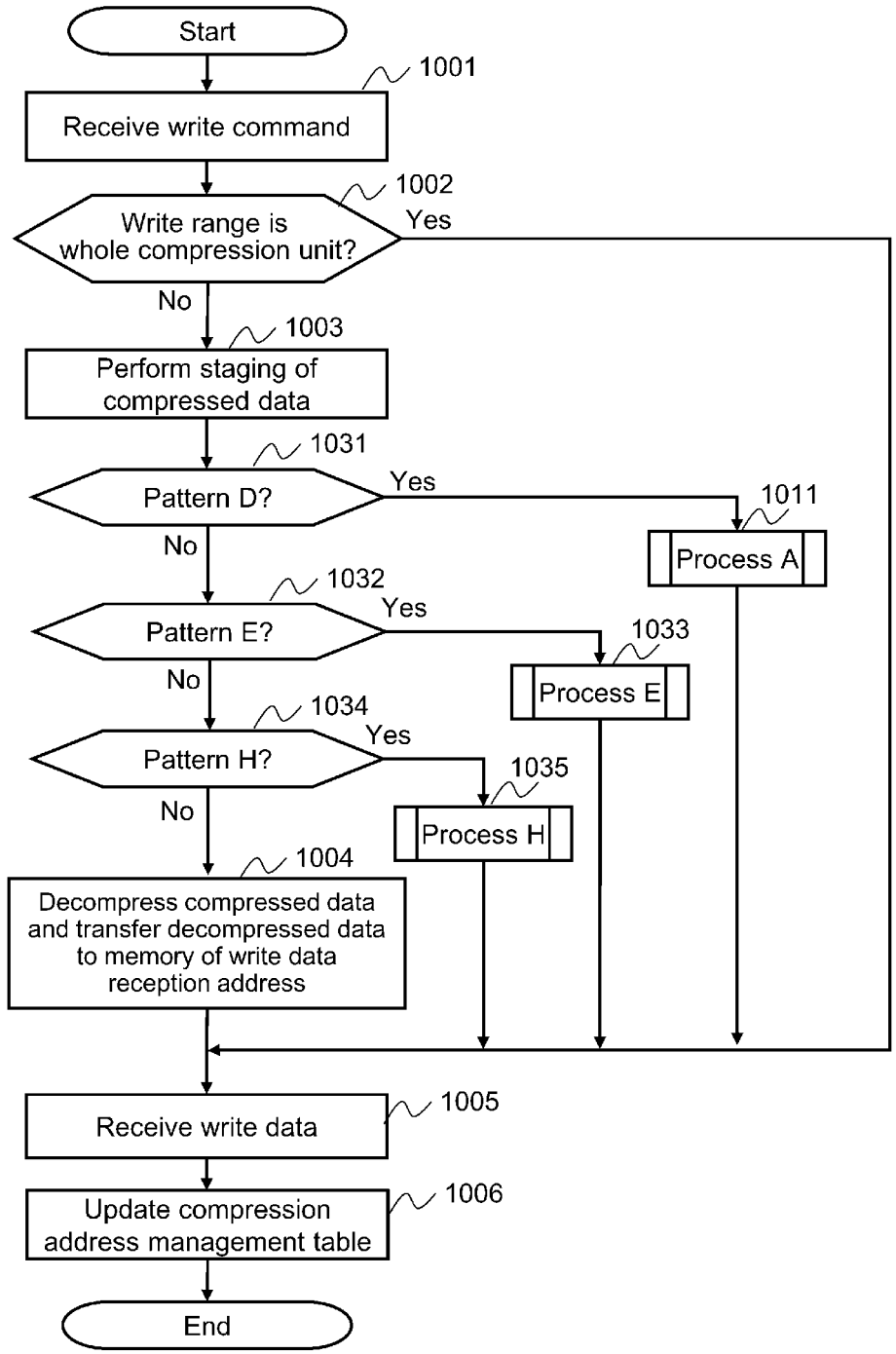
FIG. 17 is a flowchart showing an example of a write processing according to embodiment 2 of the present invention.

FIG. 17 is a flowchart showing one example of write processing of the present invention according to embodiment 2. It is similar to FIG. 10, but in FIG. 17, step 1010 of FIG. 10 is replaced with step 1031, and steps 1032, 1033, 1034 and 1035 are added.

In the following description, FIG. 17 will be described focusing on the differences with FIG. 10. After step 1003, it is determined in step 1031 whether the relevant write request is pattern D or not. If the determination result of step 1031 is Yes, the procedure advances to step 1011. Step 1011 is the same as FIG. 10. If the determination result of step 1031 is No, the procedure advances to step 1032. In step 1032, whether the write request is pattern E or not is determined. If the determination result of step 1032 is Yes, the procedure advances to step 1033. The details of process E of step 1033 will be described with reference to FIG. 18. If the determination result of step 1032 is No, the procedure advances to step 1034. In step 1034, whether the write request is pattern H or not is determined. If the determination result of step 1034 is Yes, the procedure advances to step 1035. The details of process H of step 1035 will be described with reference to FIG. 19. If the determination result of step 1034 is No, the procedure advances to step 1004. Similar to FIG. 6 and FIG. 10, in FIG. 17, it is possible to compress the write data immediately after the end of the flowchart or to store the write data as it is temporarily in the HDD and to perform compression at a given timing. Further, it is possible to receive the write data immediately after receiving the write command. In that case, it is possible to combine this process with the flowchart of FIG. 7.

Figure 18:
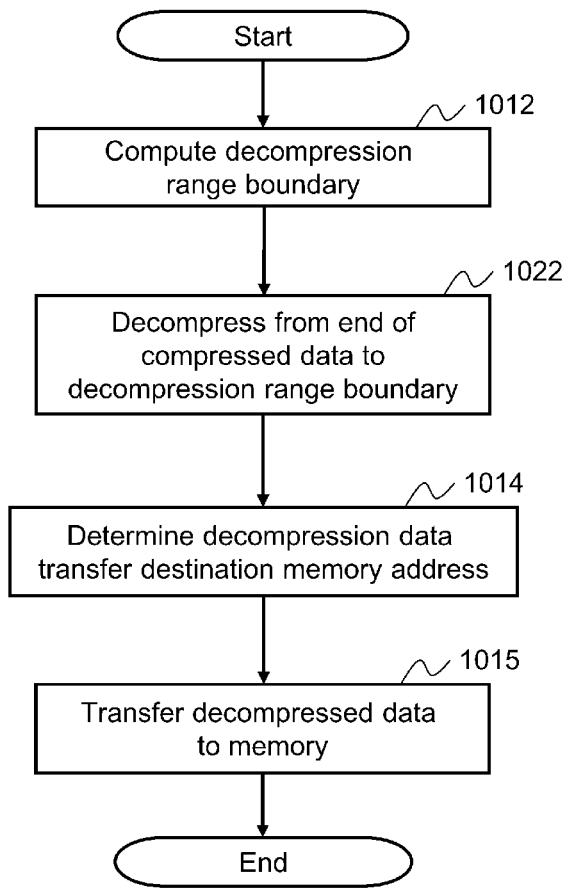
FIG. 18 is a flowchart showing an example of partial decompression processing according to embodiment 2 of the present invention.

FIG. 18 is a flowchart showing one example of the details of process E of step 1033 according to embodiment 2. It is similar to FIG. 11, but it differs from FIG. 11 in that step 1013 of FIG. 11 is replaced with step 1022 of FIG. 18. In the following, FIG. 18 will be described, focusing on the differences with FIG. 11. In step 1012, after computing the decompression range boundary in step 1012, the compressed data is decompressed from the end in step 1022, and decompression processing is executed from the beginning of the compression unit to the decompression range boundary. When decompressed data having exceeded the decompression range boundary is generated, the decompression processing should be stopped at that point of time.

Figure 19:
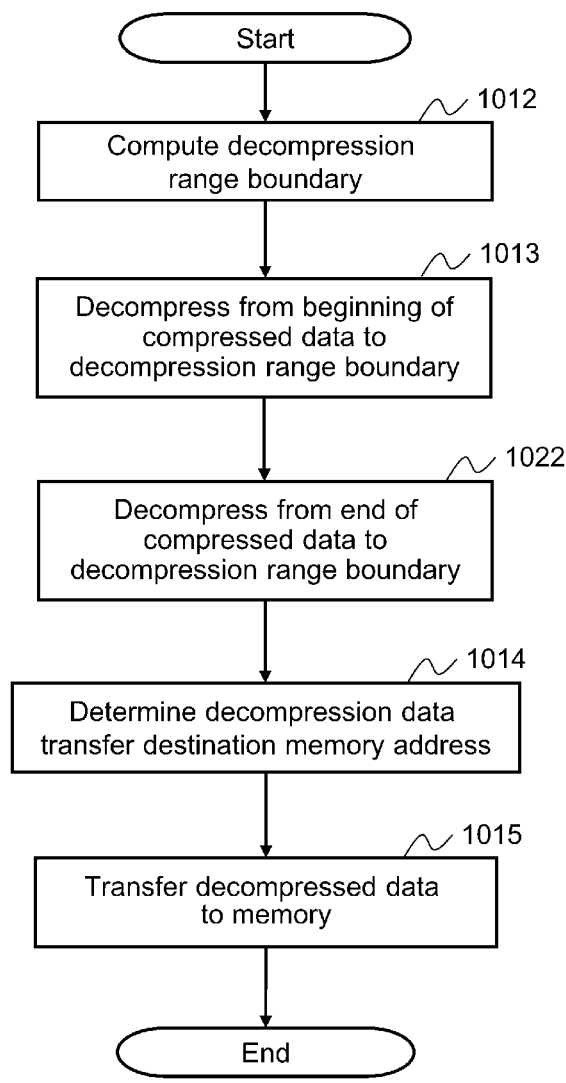
FIG. 19 is a flowchart showing another example of partial decompression processing according to embodiment 2 of the present invention.

FIG. 19 is a flowchart showing one example of the details of process H of step 1035 according to embodiment 2. It is similar to FIG. 11, but according to FIG. 19, step 1022 is added after step 1013 of FIG. 11. That is, in step 1013, decompression is performed "from the beginning of the relevant compression unit to the write start LBA", and in step 1022, decompression is performed "from the (write start LBA+write length) to the end of the relevant compression unit".

Figure 20:
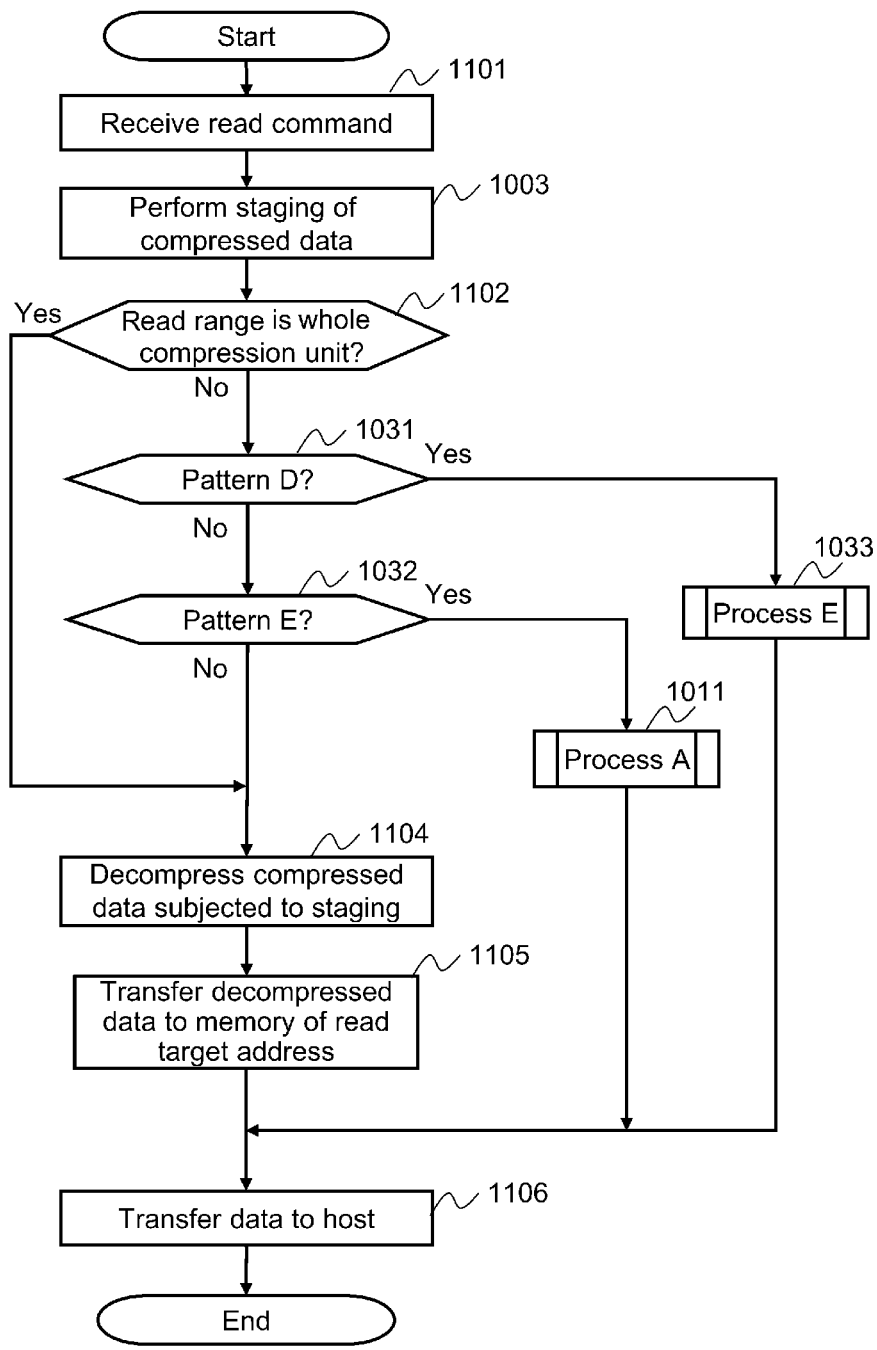
FIG. 20 is a flowchart showing an example of read processing according to embodiment 2 of the present invention.

FIG. 20 is a flowchart illustrating an example of the read processing according to embodiment 2. It is similar to FIG. 12, but the steps 1103 and 1011 in FIG. 12 are replaced with steps 1031, 1033, 1032 and 1011 in FIG. 20. In step 1031, it is determined whether the read command is pattern D or not, and in subsequent step 1032, it is determined whether the read command is pattern E or not. The other steps are the same as the steps described above, so that FIG. 20 will not be described further.

Figure 21:
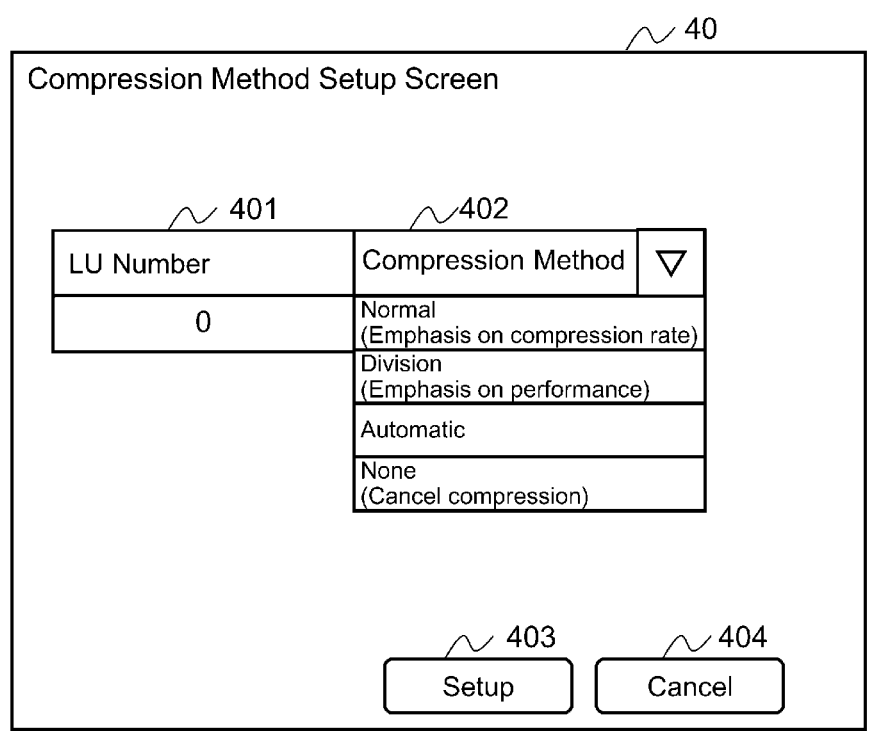
FIG. 21 is a view showing one example of a compression method setup screen according to embodiment 2 of the present invention.

FIG. 21 is a view showing one example of a compression method setup screen 40 according to embodiment 2. The compression system setup screen 40 can be a program displayed on the screen of the management computer 11 or the host computer 10 connected to the storage system 100. This program can be a part of the control program 108. The compression system setup screen 40 is composed of an LU number 401, a compression method 402, a setup button 403 and a cancel button 404. The LU number of the target LU that the administrator or the user wishes to compress is entered in the LU number 401. Further, the LU number 401 can be an internal VOL #1202. The compression method 402 can be selected from a pull-down menu showing the compression methods of the LU. One example of the pull-down menu can include "normal (emphasis on compression rate)", "division (emphasis on performance)", "automatic", and "none (cancel compression)". The "normal (emphasis on compression rate)" method refers to the compression and decompression method as described in embodiment 1. The "division (emphasis on performance)" method refers to the compression and decompression method as described in embodiment 2. The "automatic" method enables the storage system to select the compression method of the LU or to select the compression method for each compression unit of the LU. The "none (cancel compression)" method should be selected when compression is not requested or an already-compressed LU is to be returned to a non-compressed status. By selecting the setup button 403, the setup of the compression method of the LU becomes effective, and by selecting the cancel button 404, the setup of the compression method of the LU is cancelled. As an additional option menu, it is possible to enable selection of the compression algorithm performed by the storage system 100. The compression algorithm can be, for example, a runlength compression algorithm or a LZ77 system compression algorithm.

FIG. 22 is a view showing one example of a volume status management table 120 and a compression address management table 121 according to embodiment 2.

According to the volume status management table 120 of embodiment 2, a column related to compression method 1206 is added to the volume status management table 120 of embodiment 1. The compression method 1206 is an item allocated to each LU, and it is possible to reflect the content of compression method 402 of FIG. 21. "NULL" is entered if compression of the LU is not requested, "normal" is entered if compression is performed via the compression method described in embodiment 1, and "division" is entered if compression is performed via the compression method described in embodiment 2. Although not shown, if "automatic" is selected in compression method 402, "automatic" should be entered to the compression method 1206.

According to the compression address management table 121 of embodiment 2, a column related to compression method 1215 is added to the compression address management table 121 of embodiment 1. According to the compression method 1215, if "normal" is requested as the compression method 402, "normal" is entered to all entries of the compression units, and if "division" is requested as the compression method 402, "division" is entered to all entries. If "automatic" is requested as the compression method 402, the storage system 100 can select the compression method for each compression unit, and enter the selection results to the entries of the respective compression units. If the LU has not yet received any compression request or if "none" is requested in the compression method 402, "non-compressed" should be entered to the compression method 1215. However, even if compression is requested to the LU, "non-compressed" can be entered if the result of compression processing is not good and the data in the compression unit could not be compressed.

Embodiment 3

Now, the third embodiment of the present invention will be described with reference to FIGS. 23 through 25. In the third embodiment, a method described in embodiment 2 in which the decompression range boundary can be varied will be described.

FIG. 23 is a view showing a decompression boundary management table 122 according to embodiment 3. The decompression boundary management table 122 is stored in the main memory 105. The decompression boundary management table 122 is a table composed of the following items: an LBA 1211, a compression method 1215, and a decompression boundary 1221. The LBA 1211 and the compression method 1215 are the same as those in the compression address management table 121. The decompression boundary 1221 denotes an offset address of the decompression range boundary of the relevant compression unit. For example, if the decompression boundary 1221 is set to 128 KB, it means that the decompression range boundary of the relevant compression unit is at 128 KB from the beginning of the compression unit. The decompression boundary 1221 can store different values among compression units, or the decompression boundary can be changed at given timings with respect to the same compression unit. As described, by enabling the decompression range boundary to be varied for each compression unit, it becomes possible to realize a more flexible partial decompression compared to the compression method described in embodiment 2.

Figure 24:
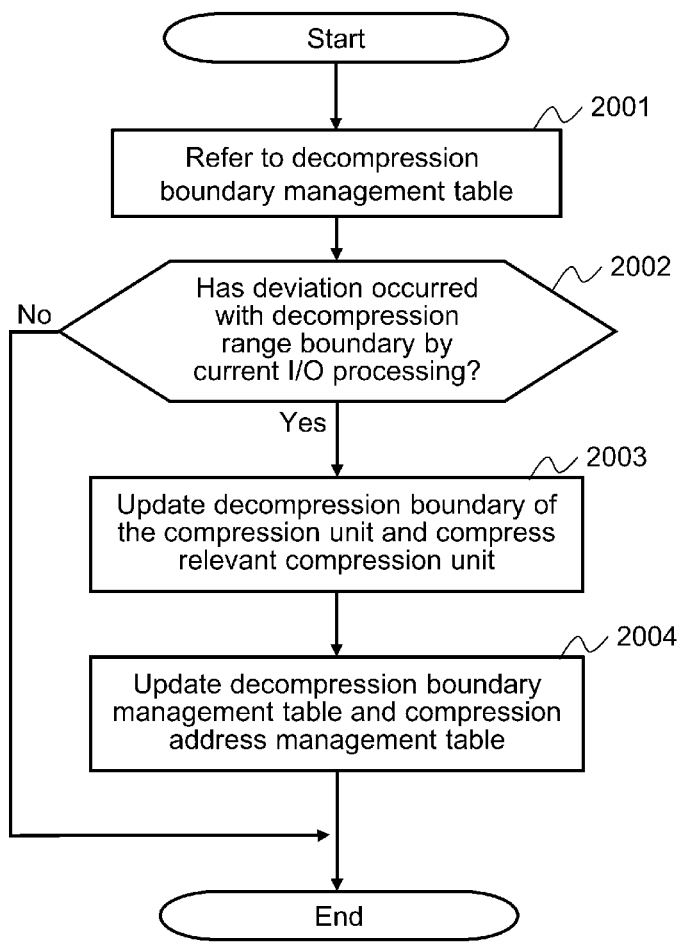
FIG. 24 is a flowchart showing an example of boundary change processing according to embodiment 3 of the present invention.

FIG. 24 is a flowchart showing one example of a boundary change processing according to the third embodiment. The boundary change processing can be performed, for example, by the storage system 100 regarding the relevant compression unit for each I/O request from the host computer 10, or can be performed at given periods of time regardless of the I/O from the host computer 10, or can be performed when the request is received from the management computer 11. In FIG. 24, we will describe an example where the boundary change processing is performed by the storage system 100 regarding the relevant compression unit for each I/O request from the host computer 10. After completing the I/O request from the host computer 10, in step 2001, the relevant compression unit of the decompression boundary management table 122 is referred to. Next, in step 2002, whether a deviation with the decompression range boundary has occurred or not by the current I/O processing is determined. What is meant by the deviation with the decompression range boundary is that, for example, in the flowchart of write processing illustrated in FIG. 17, the write range is not the whole compression unit (the determination result of step 1002 is No), and the pattern is neither pattern D, pattern E nor pattern H (all the determination results of steps 1031, 1032 and 1034 are No). The actual example of such case corresponds to pattern F and pattern G described later illustrated in FIG. 25. If the determination result of step 2002 is No, the boundary change processing is ended. If the determination result of step 2002 is Yes, in step 2003, the decompression boundary of the relevant compression unit is updated and the relevant compression unit is compressed. The actual update method of the decompression boundary will be described later, in the description of FIG. 25. Next, in step 2004, according to the compression result of the relevant compression unit, the decompression boundary management table 122 and the compression address management table 121 are updated, and the boundary change processing is ended. Further, the compression processing of the relevant compression unit in step 2003 can be executed as a different process from the boundary change processing, according to various conditions such as the load status of the storage system 100 or whether the non-compressed data of the relevant compression unit exists in the cache memory 104 or not. In that case, the process of step 2004 should also be executed as a different process. Further, step 2002 is determined by whether deviation has occurred from the decompression range boundary for each I/O processing, but instead of performing the determination for each I/O processing, it is possible to determine Yes when the deviation from the decompression range boundary has occurred equal to or more than a threshold after performing a given number of I/O processes for the relevant compression unit. Furthermore, the update of the decompression boundary of the relevant compression unit in step 2003 can be performed by counting the given number of I/O processes with respect to the relevant compression unit, and either updating the deviation having the highest frequency in the decompression boundary range, or updating the average value of the deviation.

FIG. 25 is a view showing one example of the concept of an overwrite pattern according to the third embodiment. In FIG. 25, a total of two patterns are defined based on the corresponding relationship between the compression unit and the write requested range.

Pattern F shows a case where the following two conditions are both satisfied. The two conditions are the following conditions in the relevant compression unit: "intermediate point<write start LBA" and "end LBA of non-compressed data<(write start LBA+write length)" or "end LBA of non-compressed data=(write start LBA+write length)". When both these conditions are satisfied, it must be necessary to decompress the whole compression unit, but by adjusting the decompression range boundary to move the intermediate point to the write start LBA, it will not be necessary to decompress the whole compression unit when a write request targeting the same range is received next.

Next, pattern G will be described. Pattern G refers to a case where the following two conditions are both satisfied. The two conditions are the following conditions in the relevant compression unit: "beginning LBA of non-compressed data<write start LBA" or "beginning LBA of non-compressed data=write start LBA", and "(write start LBA+write length)<intermediate point". When both these conditions are satisfied, it must be necessary to decompress the whole compression unit, but by adjusting the decompression range boundary to move the intermediate point to the (write start LBA+write length), it will not be necessary to decompress the whole compression unit when a write request targeting the same range is received next.

Embodiment 3 has been illustrated above, but the process of changing the decompression boundary illustrated here can be combined with embodiment 1 or with embodiment 2. Actually, the process illustrated in FIG. 24 of embodiment 3 can be executed immediately after step 1006 of FIG. 10 or immediately after step 1106 of FIG. 12 of embodiment 1, or the process of FIG. 24 can be executed asynchronously in embodiment 1 regardless of the read request or the write request from the host. Also regarding embodiment 2, FIG. 24 can be executed immediately after step 1006 of FIG. 17 or immediately after step 1106 of FIG. 20, or the process of FIG. 24 can be executed asynchronously regardless of the read request or the write request from the host.

Embodiment 4

Now, embodiment 4 of the present invention will be described with reference to FIGS. 26 and 27. Embodiment 4 illustrates a method in which the compression unit can be set variably.

Embodiments 1, 2 and 3 illustrate methods in which the compression unit is set to fixed lengths, but in embodiment 4, the compression unit is set to variable length. In general, the compression effect is enhanced when the compression unit becomes greater. According to the LZ77 compression algorithm, for example, the compression effect enhanced as the areas corresponding to specific data patterns increase, so that the compression unit should be set to variable length to enhance the possibility of increasing the areas corresponding to specific data patterns by enlarging the size of the compression unit. However, the compression unit causes a drawback in that the processing time of the compression and decompression processing is also increased. Therefore, by setting the compression unit to variable length and adjusting the compression unit according to the access pattern or the like of the host computer 10, the drawback is expected to be solved.

FIG. 26 is a view showing one example of the concept of data compression in the storage system 100 according to embodiment 4. The cache memory 104 stores non-compressed data 24a and 25a which are the targets of read and write requests of the host computer 10. In this example, the non-compressed data 24a and 25a have different lengths. In embodiment 4, data having different lengths can be set as compression units. In FIG. 26, the compressed data of the non-compressed data 24a is referred to as 24b, and the compressed data of the non-compressed data 25a is referred to as 25b. In embodiment 4, the compression unit has a variable length, wherein the variable length can be a common multiple (such as 256 KB, 512 KB, 768 KB and so on) of the compression unit having a fixed length described in embodiment 1, or the variable length can be other lengths. In the present specification, a common multiple of the compression unit having a fixed length is taken as an example.

Figure 27:
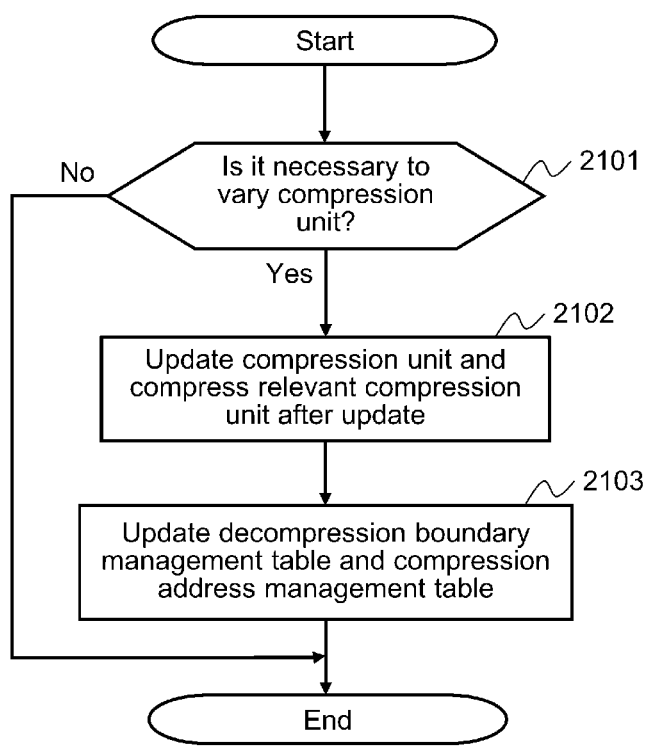
FIG. 27 is a flowchart showing one example of a compression unit change processing according to embodiment 4 of the present invention.

FIG. 27 is a flowchart showing one example of the processing for changing the compression unit according to embodiment 4. For example, the compression unit varying process can be executed by the storage system 100 regarding the relevant compression unit each time an I/O request from the host computer 10 is received, or can be executed every given period of time regardless of the I/O from the host computer 10, or can be executed when a request from the management computer 11 is received.

As an example, FIG. 27 illustrates a case where the compression unit varying process is performed by the storage system 100 regarding the relevant compression unit each time an I/O request from the host computer 10 is received. After the I/O request from the host computer 10 is completed, it is determined in step 2101 whether the compression unit must be varied or not. The actual determination method can be, for example, the change of access frequency within a given period of time of the relevant compression unit, or the change of access length (read request length, write request length)

within the given period of time of the relevant compression unit. Regarding the compression unit having the access frequency reduced, the compression unit can be increased to enhance the compression rate, or if the access length is reduced, the compression unit can be reduced to shorten the decompression processing time. If the determination result of step 2101 is No, the compression unit varying process is ended. If the determination result of step 2101 is Yes, in step 2102, the compression unit is updated and the relevant compression unit after the update is compressed. Next, in step 2103, the decompression boundary management table 122 and the compression address management table 121 are updated, and the compression unit varying process is ended. Now, as for the compression processing of the relevant compression unit in step 2102, the process can be executed as a different process from the compression unit varying process, based on conditions such as the status of load of the storage system 100 or whether the non-compressed data of the relevant compression unit exists in the cache memory 104 or not. In that case, the subsequent process of step 2103 should also be executed as a different process.

The compression method described in embodiment 4 can also adopt the decompression methods illustrated in embodiment 1 and embodiment 2. Further, the change of decompression range boundary illustrated in embodiment 3 can be adopted in embodiment 4.

Embodiment 4 has been illustrated above, wherein the compression unit varying process described here can be combined with embodiment 1, embodiment 2, or embodiment 3. Actually, the process of FIG. 27 of embodiment 4 can be executed immediately after step 1006 of FIG. 10 or immediately after step 1106 of FIG. 12, or the process of FIG. 27 can be performed asynchronously regardless of the read request or the write request from the host in embodiment 1. Regarding embodiment 2, the process of FIG. 27 can be performed immediately after step 1006 of FIG. 17 or immediately after step 1106 of FIG. 20, or the process of FIG. 27 can be performed asynchronously regardless of the read request or the write request from the host. Regarding embodiment 3, the process of FIG. 27 can be performed immediately after the process of FIG. 24, or the process of FIG. 27 can be performed regardless of the process of FIG. 24.

Embodiment 5

Now, embodiment 5 of the present invention will be described with respect to FIG. 28. Embodiment 5 illustrates an example where the storage system 100 is equipped with a storage medium having a compression function.

Figure 28:
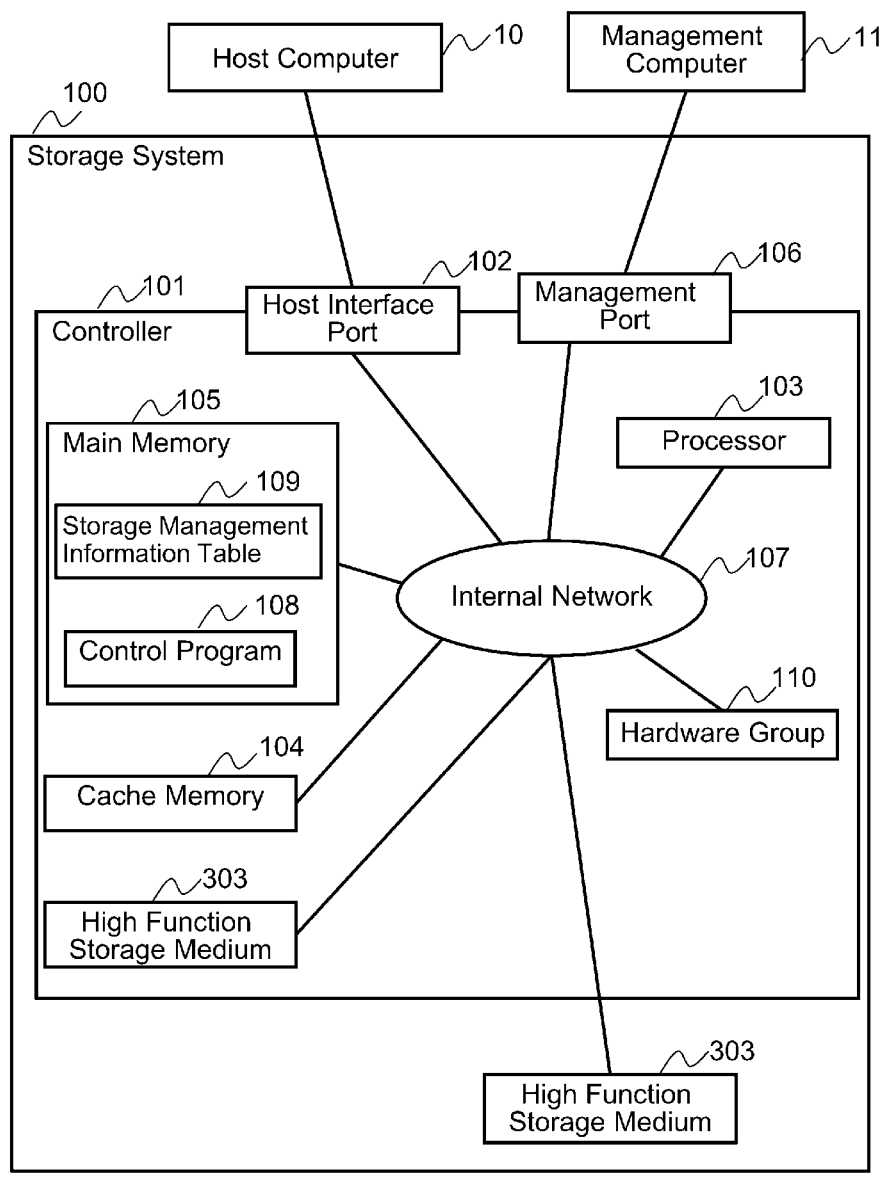
FIG. 28 is a view showing a configuration example of a storage system according to embodiment 5 of the present invention.

FIG. 28 is a view showing the configuration example of the storage system 100 according to the fifth embodiment. FIG. 28 is similar to FIG. 1, but in FIG. 28, a high function storage medium 303 is additionally mounted to the storage system 100. A high function storage medium 303 is a conventional storage medium such as an HDD or an SSD (Solid State Drive) having a high function dedicated controller built therein, so that the storage medium itself has a compression function. The high function storage medium 303 can be built into the controller 101 as an element constituting the controller 101, or can be disposed outside the controller 101 and connected to the controller 101.

The fifth embodiment can be applied to any one of the compression methods, decompression methods, decompression boundary change processing and compression unit varying process illustrated in embodiments 1, 2, 3 and 4. The compression processing and the decompression processing can be executed mainly by the controller of the high function storage medium 303, or the controller of the high function storage medium 303 and the processor 103 can execute the processes in a cooperative manner by monitoring the mutual load statuses. The storage medium of the high function storage medium 303 can be any medium as long as it is a non-volatile storage medium, and it can be a semiconductor memory such as a flash memory. The high function storage medium 303 can also include a compression address management table 121 and a decompression boundary management table 122.

REFERENCE SIGNS LIST

10: Host computer
11: Management computer
100: Storage system
101: Controller
102: Host interface port
103: Processor
104: Cache memory
105: Main memory
106: Management port
107: Internal network
108: Control program
109: Storage management information table
110: Hardware group
120: Volume status management table
121: Compression address management table
122: Decompression boundary management table
301: Logical volume
302: Virtual volume
303: High function storage medium
40: Compression method setup screen
401: LU number
402: Compression method
403: Setup button
404: Cancel button

The invention claimed is:

1. A method for generating data in a storage system configured to compress data via a compression processor and store the data; wherein
if a write request targets a portion of the compression unit, decompressing only a portion of the compression unit not included in a target range of the write request, and generating decompressed data based on a decompressed portion of the compression unit not included in the target range of the write request and the write data corresponding to the write request; and
storing non-compressed data in a cache memory, wherein the non-compressed data are targets of a read processing and a write processing and correspond to a different logical address of a virtual volume, wherein the compressed data and non-compressed data is stored in the virtual volume, and wherein compression processing is executed at a predetermined timing; wherein
a non-compressed data unit corresponding to the compression unit is divided at an intermediate point, wherein data from a beginning of the non-compressed data unit to the intermediate point thereof is compressed from the beginning, and data from the intermediate point to an end of the non-compressed data unit is searched from the end toward the intermediate point to have data compressed from the end, by which a compressed data of each compression unit is created, wherein when the write requests targets a portion of said compression unit, if a start address of the write request is smaller than or equal to a beginning address of a non-compressed data unit and an address adding a write data length to the start address of the write request is smaller than the intermediate point, the intermediate point is set variably as a decompression range boundary, and by moving the decompression range boundary to a position equivalent to an address adding the write data length to the start address of the write request, a portion of the compression unit corresponding to a range starting from an address adding the write data length to a start address of the write request which is the decompression range boundary to an end address of the non-compressed data unit is decompressed as a portion not included in the target range of the write request.

2. The method for generating data in a storage system according to claim 1, wherein if the write request straddles a plurality of compression units, a compression unit of the plurality of compression units in which the whole compression unit is the target of the write request will not be decompressed, and the write data corresponding to the write request of a range corresponding to said whole compression unit will be used.

3. The method for generating data in a storage system according to claim 1, wherein if the write request targets a portion of said compression unit, wherein a start address of the write request is greater than a beginning address of a non-compressed data unit and an address adding a write data length to the start address of the write request is equal to or greater than an end address of the non-compressed data unit, a portion of the compression unit corresponding to a range from the beginning address of the non-compressed data unit to the start address of the write request is decompressed as a portion not included in the target range of the write request.

4. The method for generating data in a storage system according to claim 1, wherein a non-compressed data unit corresponding to the compression unit is divided at an intermediate point, wherein data from a beginning of the non-compressed data unit to the intermediate point thereof is compressed from the beginning, and data from the intermediate point to an end of the non-compressed data unit is searched from the end toward the intermediate point to have data compressed from the end, by which a compressed data of each beginning and end compression unit is created, and when the write requests targets a portion of said compression unit, if a start address of the write request is smaller than or equal to a beginning address of a non-compressed data unit, and an address adding a write data length to the start address of the write request is equal to or greater than the intermediate point and smaller than an end address of the non-compressed data unit, a portion of the compression unit corresponding to a range starting from an address adding the write data length to a start address of the write request to an end address of the non-compressed data unit is decompressed as a portion not included in the target range of the write request.

5. The method for generating data in a storage system according to claim 1, wherein a non-compressed data unit corresponding to the compression unit is divided at an intermediate point, wherein data from a beginning of the non-compressed data unit to the intermediate point thereof is compressed from the beginning, and data from the intermediate point to an end of the non-compressed data unit is searched from the end toward the intermediate point to have data compressed from the end, by which a compressed data of each compression unit is created, and when the write requests targets a portion of said compression unit, if a start address of the write request is greater than a beginning address of a non-compressed data unit and smaller than or equal to the intermediate point, and an address adding a write data length to the start address of the write request is smaller than an end address of the non-compressed data unit, a portion of the compression unit corresponding to an area starting from a beginning address of the non-compressed data unit to a start address of the write request and a portion of the compression unit corresponding to a range starting from an address adding a write data length to the start address of the write request to an end address of the non-compressed data unit are decompressed as a portion not included in the target range of the write request.

6. The method for generating data in a storage system according to claim 1, wherein a non-compressed data unit corresponding to the compression unit is divided at an intermediate point, wherein data from a beginning of the non-compressed data unit to the intermediate point thereof is compressed from the beginning, and data from the intermediate point to an end of the non-compressed data unit is searched from the end toward the intermediate point to have data compressed from the end, by which a compressed data of each compression unit is created, wherein when the write requests targets a portion of said compression unit, if a start address of the write request is greater than the intermediate point and the address adding a write data length to the start address of the write request is smaller than or equal to the end address of a non-compressed data unit the intermediate point is set variably as a decompression range boundary, and by moving the decompression range boundary to the start address of the write request, a portion of the compression unit corresponding to a range starting from a beginning address of the non-compressed data unit to a start address of the write request, which is the decompression range boundary, is decompressed as a portion not included in the target range of the write request.

7. The method for generating data in a storage system according to claim 5, wherein the compression unit has a variable length, and the length of the compression unit is varied according to a change of access frequency or a change of access length of the compression unit within a given period of time.

8. The method for generating data in a storage system according to claim 5, wherein a data compression format is capable of being set using an operation screen.

* * * * *